US012608157B2

(12) United States Patent
Oh et al.

(10) Patent No.: US 12,608,157 B2
(45) Date of Patent: Apr. 21, 2026

(54) NONVOLATILE MEMORY DEVICE, CONTROLLER FOR CONTROLLING THE SAME, STORAGE DEVICE HAVING THE SAME, AND METHOD OF OPERATING THE SAME

(71) Applicant: SAMSUNG ELECTRONICS CO., LTD., Suwon-si (KR)

(72) Inventors: Eun Chu Oh, Hwaseong-si (KR); Byungchul Jang, Suwon-si (KR); Junyeong Seok, Suwon-si (KR); Younggul Song, Suwon-si (KR); Joonsung Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1131 days.

(21) Appl. No.: 17/577,771

(22) Filed: Jan. 18, 2022

(65) Prior Publication Data

US 2023/0015496 A1 Jan. 19, 2023

(30) Foreign Application Priority Data

Jul. 14, 2021 (KR) ........................ 10-2021-0092395

(51) Int. Cl.
*G06F 12/00* (2006.01)
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0604; G06F 3/0659; G06F 3/0679
USPC ....................................................... 711/154
See application file for complete search history.

(56) References Cited

U.S. PATENT DOCUMENTS

| | | | |
|---|---|---|---|
| 7,679,133 B2 | 3/2010 | Son et al. | |
| 8,436,289 B1 * | 5/2013 | Hossain | ................ H10F 39/803 |
| | | | 250/214.1 |
| 8,553,466 B2 | 10/2013 | Han et al. | |
| 8,559,235 B2 | 10/2013 | Yoon et al. | |
| 8,576,624 B2 | 11/2013 | Dutta et al. | |

(Continued)

FOREIGN PATENT DOCUMENTS

KR 10-2019-0112421 A 10/2019

OTHER PUBLICATIONS

Office Action in Korean Appln. No. 10-2021-0092395, mailed on Sep. 30, 2025, 14 pages (with English translation).

*Primary Examiner* — Mohamed M Gebril
(74) *Attorney, Agent, or Firm* — Fish & Richardson P.C.

(57) ABSTRACT

A nonvolatile memory (NVM) device includes a plurality of memory blocks and a control logic receiving a specific command and an address. The control logic may perform a cell count-based dynamic read (CDR) operation on memory cells connected to one of wordlines of a selected block, among the plurality of memory blocks, in response to the address. The control logic includes a cell count comparator circuit configured to compare: (1) a first cell count value for a highest state among a plurality of states with at least one reference value according to the CDR operation and (2) a second cell count value for an erase state among the plurality of states with the at least one reference value. Additionally, the control logic includes a read level selector configured to select a read level according to a result of the comparison of the cell count comparator circuit.

20 Claims, 27 Drawing Sheets

(56) References Cited

U.S. PATENT DOCUMENTS

| | | | |
|---|---|---|---|
| 8,654,587 B2 | 2/2014 | Yoon et al. | |
| 9,299,450 B1 * | 3/2016 | Pang | G11C 16/0483 |
| 9,536,970 B2 | 1/2017 | Seol et al. | |
| 9,543,031 B2 | 1/2017 | Kim | |
| 9,563,503 B2 | 2/2017 | Seo et al. | |
| 9,620,220 B2 * | 4/2017 | Zhao | G11C 11/5642 |
| 9,812,213 B2 | 11/2017 | Kim et al. | |
| 10,090,046 B2 | 10/2018 | Park et al. | |
| 10,229,749 B2 | 3/2019 | Oh et al. | |
| 10,381,090 B2 | 8/2019 | Oh et al. | |
| 10,559,362 B2 | 2/2020 | Shin et al. | |
| 10,607,708 B2 | 3/2020 | Oh et al. | |
| 10,629,259 B2 | 4/2020 | Jang | |
| 10,802,728 B2 | 10/2020 | Lee et al. | |
| 10,943,664 B2 | 3/2021 | Kwak | |
| 10,998,057 B2 | 5/2021 | Choi et al. | |
| 11,355,216 B1 * | 6/2022 | Wu | G11C 16/26 |
| 2008/0263265 A1 | 10/2008 | Litsyn et al. | |
| 2014/0063940 A1 | 3/2014 | Chen et al. | |
| 2015/0287453 A1 | 10/2015 | Wu et al. | |
| 2016/0225440 A1 | 8/2016 | Han et al. | |
| 2018/0286495 A1 | 10/2018 | Oh et al. | |
| 2019/0267104 A1 * | 8/2019 | Lee | G11C 16/08 |
| 2019/0287629 A1 * | 9/2019 | Bang | G06F 3/0688 |
| 2019/0287643 A1 * | 9/2019 | Kim | G11C 16/3459 |
| 2020/0090763 A1 * | 3/2020 | Tokutomi | G06F 3/0679 |
| 2020/0098436 A1 | 3/2020 | Kim et al. | |
| 2020/0151539 A1 | 5/2020 | Oh et al. | |
| 2020/0310959 A1 * | 10/2020 | Byun | G06F 12/0253 |
| 2021/0050067 A1 | 2/2021 | Oh et al. | |
| 2021/0109669 A1 | 4/2021 | Wisnovsky et al. | |
| 2022/0172785 A1 * | 6/2022 | Yoo | G11C 11/5671 |
| 2022/0189575 A1 * | 6/2022 | Seo | G11C 29/028 |
| 2022/0276796 A1 * | 9/2022 | Berman | G06F 11/008 |
| 2023/0110946 A1 * | 4/2023 | Muzzetto | G11C 16/26 |
| | | | 711/103 |

* cited by examiner

Trap layer

Channel    Tunneling
layer

SiN Trap

| | Condition | Offset |
|---|---|---|
| Case1 | X ≥ REF1 | OST1 |
| Case2 | REF1 > X ≥ REF2 | OST2 |
| Case3 | REF2 > X ≥ REF3 | OST3 |
| Case4 | REF3 > X ≥ REF4 | OST4 |
| Case5 | REF4 > X ≥ REF5 | OST5 |
| Case6 | REF5 > X | OST6 |

|  | Normal Read | | | | Read |
|---|---|---|---|---|---|
| Page1 | CMD | HST CDR | Other State | Read | Level |
|  | Normal Read | | | | |
| Page2 |  |  | ERS CDR |  |  |
| Page3 |  |  |  |  |  |
| Page4 |  |  |  |  |  |

FIG. 9C

PRMT

| C1 | C2 | C3 | C4 | C5 |
|----|----|----|----|----|

RLOST

| OFS1 | OFS2 | OFS3 | OFS4 | OFS5 | · · · | OFS24 |
|------|------|------|------|------|-------|-------|

| Cell Count (OCC) Range | Read Level Sets |
|------------------------|-----------------|
| $OCC > C1$ | RLS1 |
| $C2 < OCC \leq C1$ | RLS2 |
| $C3 < OCC \leq C2$ | RLS3 |
| $C4 < OCC \leq C3$ | RLS4 |
| $C5 < OCC \leq C4$ | RLS5 |
| $OCC \leq C5$ | RLS6 |

FIG. 11B

NONVOLATILE MEMORY DEVICE, CONTROLLER FOR CONTROLLING THE SAME, STORAGE DEVICE HAVING THE SAME, AND METHOD OF OPERATING THE SAME

CROSS TO REFERENCE TO RELATED APPLICATIONS

This application claims benefit of priority to Korean Patent Application No. 10-2021-0092395 filed on Jul. 14, 2021, in the Korean Intellectual Property Office, the disclosure of which is incorporated herein by reference in its entirety.

BACKGROUND

Example embodiments of the present disclosure relate to a nonvolatile memory device, a controller for controlling the same, a storage device having the same, and a method of operating the same.

Generally, a storage device including a NAND flash memory, such as a solid state drive (SSD) and a memory card, has been widely used. The NAND flash memory may store data by changing threshold voltages of memory cells and may read data using a predetermined read level. However, as a threshold voltage of the memory cells changes due to deterioration of the memory cells, a read error may occur.

SUMMARY

An example embodiment of the present disclosure is to provide a nonvolatile memory device which may improve reliability of data, a controller for controlling the same, a storage device having the same, and a method of operating the same.

According to an example embodiment of the present disclosure, a nonvolatile memory device includes a plurality of memory blocks including at least two strings between each of bitlines and a common source line, where each of the at least two strings includes at least one string select transistor connected between one of the bitlines and the common source line in series, a plurality of memory cells, and at least one ground transistor, the at least one string select transistor has a gate connected to a string selection line, each of the plurality of memory cells receives a wordline voltage from a corresponding wordline, and the at least one ground transistor has a gate connected to a ground selection line; and a control logic receiving a specific command and an address, and performing a cell count-based dynamic read (CDR) operation on memory cells connected to one of wordlines of a selected block among the plurality of memory blocks in response to the address. The control logic includes a cell count comparator circuit configured to compare a first cell count value for a highest state among a plurality of states with at least one reference value according to the CDR operation and to compare a second cell count value for an erase state among the plurality of states with the at least one reference value. The control logic also includes a read level selector configured to select a read level according to a result of the comparison of the cell count comparator circuit.

According to an example embodiment of the present disclosure, a method of operating a nonvolatile memory device includes receiving a specific command; performing a cell count operation for a highest state among a plurality of states and an erase state among the plurality of states in response to the specific command; and changing a read level according to the cell count operation.

According to an example embodiment of the present disclosure, a storage device includes at least one nonvolatile memory device and a controller controlling the at least one nonvolatile memory device, wherein the controller includes control pins providing control signals to the at least one nonvolatile memory device; a buffer memory configured to store a read level offset lookup table; an error correction circuit configured to correct an error in read data read from the at least one nonvolatile memory device in response to a read command; and a processor configured to drive a parameter generator unit when an error in the read data is uncorrectable. The parameter generator unit generates reference values related to a cell count-based dynamic read (CDR) operation using environmental information. A parameter and the read level offset lookup table are transmitted to the at least one nonvolatile memory device along with the CDR command. The CDR operation includes a first cell count operation for a highest state among a plurality of states and a second cell count operation for an erase state among the plurality of states.

According to an example embodiment of the present disclosure, a method of operating a controller includes receiving a read request from a host; transmitting a read command corresponding to the read request to a nonvolatile memory device; receiving first read data corresponding to the read command from the nonvolatile memory device; determining whether the first read data is error-uncorrectable; transmitting a cell count-based dynamic read (CDR) command to the nonvolatile memory device when the read data is not error-uncorrectable; and receiving second read data corresponding to the CDR command from the nonvolatile memory device. The nonvolatile memory device performs a cell count operation for a highest state and an erase state among a plurality of states in response to the CDR command.

According to an example embodiment of the present disclosure, a method of operating a nonvolatile memory device includes receiving a normal read command; performing a normal read operation in response to the normal read command; receiving a cell count-based dynamic read (CDR) command; performing a cell count operation for a highest state and an erase state among a plurality of states in response to the CDR command; selecting a read level set according to the cell count operation; and performing a read operation using the selected read level set.

According to an example embodiment of the present disclosure, a nonvolatile memory device includes a memory cell area having a first metal pad; a peripheral circuit area having a second metal pad and vertically connected to the first metal pad through the second metal pad, a memory cell array including a plurality of memory blocks having a plurality of memory cells connected to a plurality of wordlines and a plurality of bitlines in the memory cell area; a row decoder configured to select one of the plurality of wordlines in the peripheral circuit area; a page buffer circuit having a plurality of page buffers connected to the plurality of bitlines in the peripheral circuit area; and a control logic receiving a command latch enable (CLE) signal, an address latch enable (ALE) signal, a chip enable (CE) signal, a write enable (WE) signal, a read enable (RE) signal, and a DQS signal through the control pins, and performing a cell count-based dynamic read (CDR) operation by latching a command or an address on an edge of the WE signal in response to the CLE signal and the ALE signal. The control logic includes a cell count comparator circuit configured to compare the cell count value according to the CDR operation with a reference value and a read level selector configured select a read level according to a result of the comparison of the cell count comparator circuit. The CDR operation includes a first cell count operation for a highest state among a plurality of states and a second cell count operation for an erase state among the plurality of states.

BRIEF DESCRIPTION OF DRAWINGS

The above and other aspects, features, and advantages of the present disclosure will be more clearly understood from the following detailed description, taken in conjunction with the accompanying drawings, in which:

FIGS. 9A, 9B, and 9C are diagrams illustrating various methods of a cell count operation with respect to a highest state and an erase state according to an example embodiment of the present disclosure;

FIGS. 11A and 11B are diagrams illustrating changing of a read level in a cell count-based dynamic read operation of a nonvolatile memory device according to an example embodiment of the present disclosure;

DETAILED DESCRIPTION

Hereinafter, embodiments of the present disclosure will be described as below with reference to the accompanying drawings.

A nonvolatile memory device, a controller for controlling the same, a storage device having the same, and a method of operating the same may, by correcting a read level using cell count information of an erase state and a highest program state, improve reliability of data.

Figure 1:
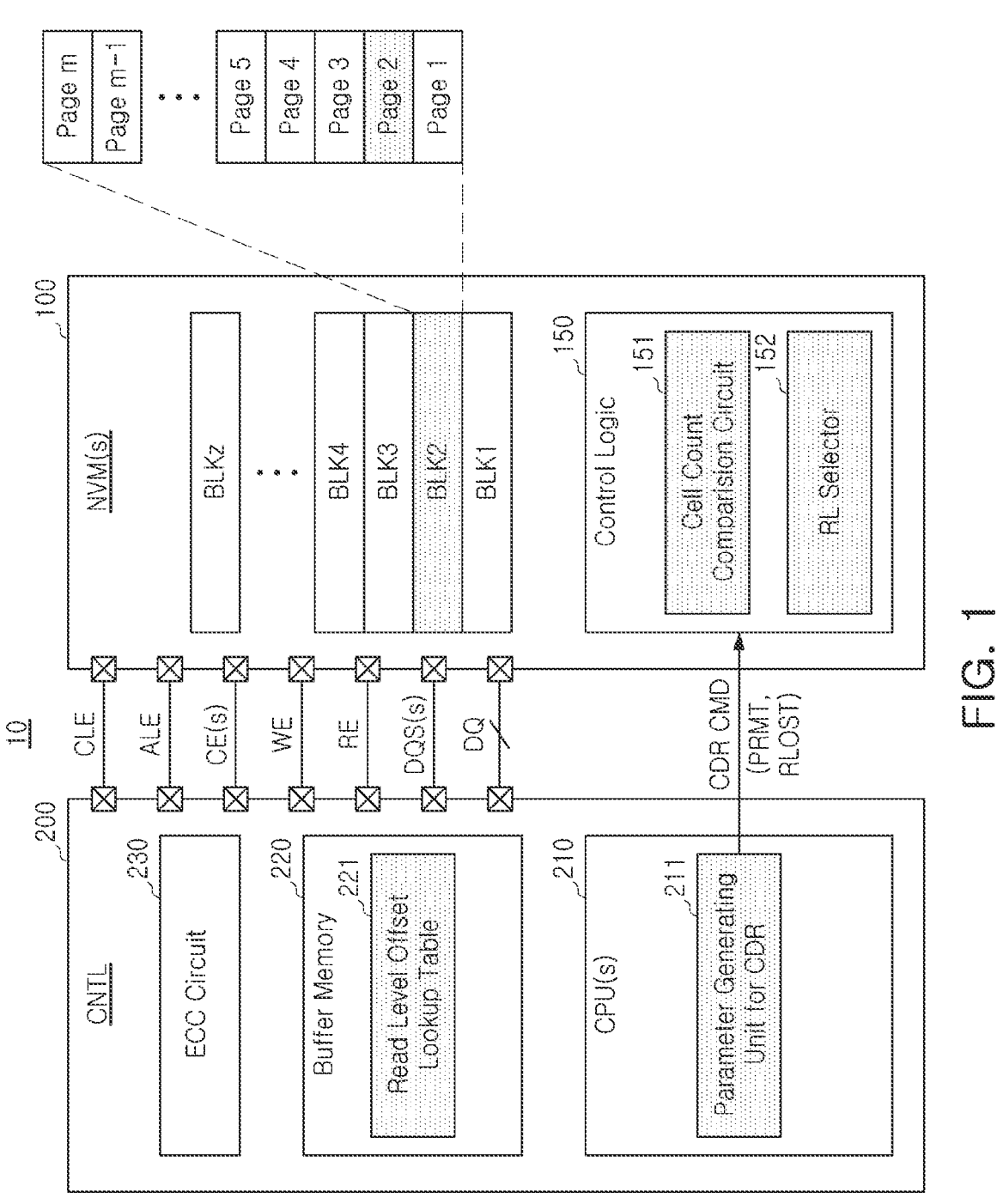
FIG. 1 is a diagram illustrating a storage device according to an example embodiment of the present disclosure.

FIG. 1 is a diagram illustrating a storage device 10 according to an example embodiment. Referring to FIG. 1, the storage device 10 may include at least one nonvolatile memory device 100 (NVM(s)) and a controller 200 CNTL.

At least one nonvolatile memory device 100 (NVM(s)) may be implemented to store data. The nonvolatile memory device 100 may include a NAND flash memory, a vertical NAND flash memory, a NOR flash memory, a resistive random access memory (RRAM), a phase change memory (PRAM), a magnetoresistive random access memory (MRAM), a ferroelectric random access memory (FRAM), a spin transfer torque random access memory (SST-RAM), or the like. Also, the nonvolatile memory device 100 may be implemented in a three-dimensional array structure. The example embodiment may be applicable to a flash memory device in which a charge storage layer is configured as a conductive floating gate and also to a charge trap flash (CTF) in which a charge storage layer is configured as an insulating layer. Hereinafter, the nonvolatile memory device 100 will be referred to as a vertical NAND flash memory device (VNAND) for ease of description.

Also, the nonvolatile memory device 100 may be implemented to include a plurality of memory blocks (BLK1-BLKz) (where z is an integer equal to or greater than 2) and a control logic 150. Each of the plurality of memory blocks BLK1-BLKz may include a plurality of pages Page 1-Page m (where m is an integer equal to or greater than 2). Each of the plurality of pages Page 1-Page m may include a plurality of memory cells. Each of the plurality of memory cells may store at least one bit.

The control logic 150 may receive a command and an address from the controller 200 and may perform an operation (a program operation, a read operation, an erase operation, or the like) corresponding to the received command on memory cells corresponding to the address.

Also, the control logic 150 may include a cell count comparator circuit 151 and a read level selector 152. The cell count comparator circuit 151 may compare a cell count value corresponding to at least one state (e.g., an uppermost program state or an erase state) with a reference value. The reference value may be included in the parameter PRMT transmitted from the controller 200. The read level selector 152 may select a read level offset according to a result of the comparison of the cell count comparator circuit 151. The read level offset may be included in the read level offset lookup table RLOST transmitted from the controller 200.

The controller 200 CNTL may be connected to the at least one nonvolatile memory device 100 through a plurality of control pins for transmitting control signals (e.g., CLE, ALE, CE(s), WE, RE, or the like) and may also be implemented to control the nonvolatile memory device 100 using control signals (CLE, ALE, CE(s), WE, RE, or the like). For example, the nonvolatile memory device 100 may perform a program operation/read operation/erase operation by latching a command CMD or an address ADD on an edge of a write enable (WE) signal according to a command latch enable (CLE) signal and an address latch enable (ALE) signal. For example, during a read operation, the chip enable signal CE is activated, CLE is activated during a command transmission interval, ALE is activated during an address transmission interval, and RE indicates that data is transmitted through the data signal line DQ. It can be toggled in the transmission section. The data strobe signal DQS may be toggled with a frequency corresponding to the data input/output speed. The read data may be sequentially transmitted in synchronization with the data strobe signal DQS.

Also, the controller 200 may include at least one processor 210 (CPU(s)), a buffer memory 220 and an error correction circuit 230.

At least one processor 210 (CPU(s)) may be implemented to control overall operations of the storage device 10. The processor 210 may perform various management operations such as cache/buffer management, firmware management, garbage collection management, wear leveling management, data deduplication management, read refresh/reclaim management, bad block management, multi-stream management, mapping of host data and nonvolatile memory management, quality of service (QoS) management, system resource allocation management, nonvolatile memory queue management, read level management, erase/program management, hot/cold data management, power loss protection management, dynamic thermal management, initialization management, redundant array of inexpensive disk (RAID) management, and the like.

Also, the processor 210 may be implemented to drive a parameter generator unit 211. The parameter generator unit 211 may generate a parameter PRMT required to perform a cell count dynamic read operation CDR. The cell count dynamic read operation (CDR) may be to compensate a read level based on cell count information. In an example embodiment, the cell count dynamic read operation (CDR) may be performed when error correction is impossible in a normal read operation. In an example embodiment, the parameter PRMT may be generated based on various environmental information (the number of bit errors, a program/erase cycle, a read cycle, a temperature, a physical location, or the like). In an example embodiment, the parameter generator unit 211 may be implemented in hardware/software/firmware.

Also, the processor 210 may transmit a cell count-based dynamic read command CDR CMD for the above-described cell count dynamic read operation CDR to the nonvolatile memory device 100. The cell count-based dynamic read command CDR CMD may include a parameter PRMT and a read level offset lookup table RLOST.

The buffer memory 220 may be implemented as a volatile memory (e.g., a static random access memory (SRAM), a dynamic RAM (DRAM), a synchronous RAM (SDRAM), or the like) or a nonvolatile memory (a flash memory, a phase-change RAM (PRAM), a magneto-resistive RAM (MRAM), a resistive RAM (ReRAM), a ferro-electric RAM (FRAM), or the like). Also, the buffer memory 220 may store the read level offset lookup table 221. The read level offset lookup table 221 may include read level offset information corresponding to the cell count information.

The ECC circuit 230 may be implemented to generate an error correction code (ECC) during a program operation and may recover data DATA using the error correction code during a read operation. That is, the ECC circuit 230 may generate an error correction code ECC for correcting a fail bit or an error bit of data received from the nonvolatile memory device 100. Also, the ECC circuit 230 may form data to which a parity bit is added by performing error correction encoding of data provided to the nonvolatile memory device 100. The parity bit may be stored in the nonvolatile memory device 100.

Also, the ECC circuit 230 may perform error correction decoding on data output by the nonvolatile memory device 100. The ECC circuit 230 may correct an error using parity. The ECC circuit 230 may correct an error using a low density parity check (LDPC) code, a BCH code, a turbo code, a Reed-Solomon code, a convolution code, a recursive systematic code (RSC), a coded modulation such as a trellis-coded modulation (TCM), and a block coded modulation (BCM). When error correction is impossible in the error correction circuit 230, a read retry operation may be performed.

The storage device 10 in an example embodiment may improve data reliability by performing the cell count-based dynamic read operation (CDR) when error correction is impossible in a normal read operation.

Figure 2:
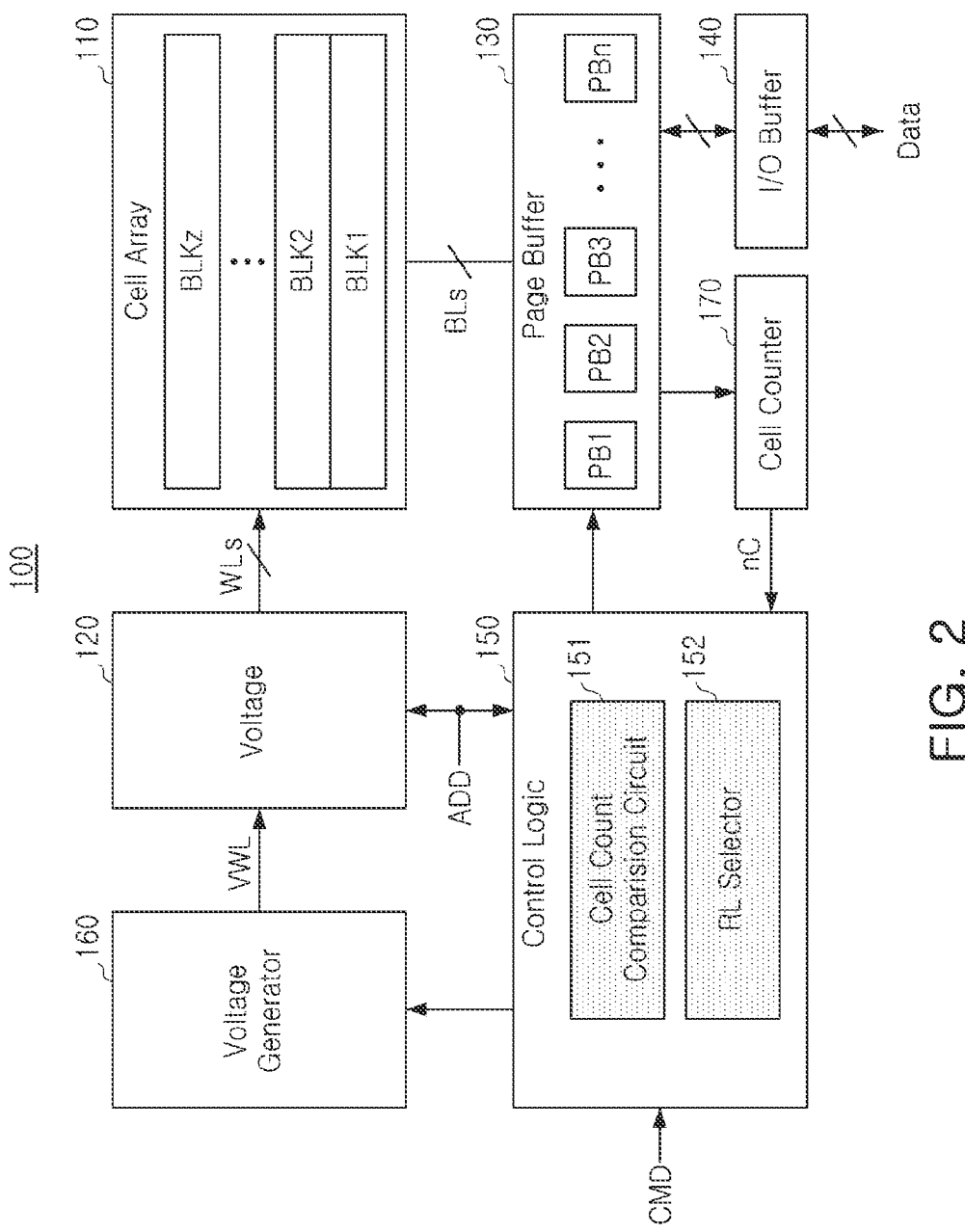
FIG. 2 is a diagram illustrating a nonvolatile memory device illustrated in FIG. 1.

FIG. 2 is a diagram illustrating a nonvolatile memory device 100 illustrated in FIG. 1. Referring to FIG. 2, the nonvolatile memory device 100 may include a memory cell array 110, a row decoder 120, a page buffer circuit 130, an input/output buffer circuit 140, a control logic 150, a voltage generator 160, and a cell counter 170.

The memory cell array 110 may be connected to the row decoder 120 through wordlines WLs or selection lines SSL and GSL. The memory cell array 110 may be connected to the page buffer circuit 130 through bitlines BLs. The memory cell array 110 may include a plurality of cell strings. Each channel of the cell strings may be formed in a vertical or horizontal direction. Each of the cell strings may include a plurality of memory cells. The plurality of memory cells may be programmed, erased, or read by a voltage applied to the bitline BLs or the wordline WLs. Generally, a program operation may be performed in units of pages, and an erase operation may be performed in units of blocks. The memory cells are described in greater detail in US registered U.S. Pat. Nos. 7,679,133, 8,553,466, 8,654,587, 8,559,235, and 9,536,970, which are incorporated herein by reference. In an example embodiment, the memory cell array 330 may include a two-dimensional memory cell array, and the two-dimensional memory cell array may include a plurality of NAND strings disposed in a row direction and a column direction.

The row decoder 120 may be implemented to select one of the memory blocks BLK1-BLKz of the memory cell array 110 in response to the address ADD. The row decoder 120 may select one of the wordlines of the selected memory block in response to the address ADD. The row decoder 120 may transfer the wordline voltage VWL corresponding to the operation mode to the wordline of the selected memory block. During a program operation, the row decoder 120 may apply a program voltage and a verify voltage to a selected wordline and may apply a pass voltage to an unselected wordline. During a read operation, the row decoder 120 may apply a read voltage to a selected wordline and may apply a read pass voltage to an unselected wordline.

The page buffer circuit 130 may be implemented to operate as a write driver or a sense amplifier. During a program operation, the page buffer circuit 130 may apply a bitline voltage corresponding to data to be programmed to the bitlines of the memory cell array 110. During a read operation or a verify read operation, the page buffer circuit 130 may sense data stored in the selected memory cell through the bitline BL. Each of the plurality of page buffers PB1-PBn (n is an integer equal to or greater than 2) included in the page buffer circuit 130 may be connected to at least one bitline.

Each of the plurality of page buffers PB1-PBn may be implemented to perform sensing and latching for performing an OVS operation. That is, each of the plurality of page buffers PB1-PBn may perform a plurality of sensing operations to identify one of states stored in the selected memory cells under control of the control logic 150. Also, each of the plurality of page buffers PB1-PBn may store data sensed through the plurality of sensing operations and may select one of data under control of the control logic 150. That is, each of the plurality of page buffers PB1-PBn may perform the sensing a plurality of times to identify one of the states. Also, each of the plurality of page buffers PB1-PBn may select or output optimal data from among a plurality of sensed data according to the control of the control logic 150.

The input/output buffer circuit 140 may provide data provided from an external entity to the page buffer circuit 130. The input/output buffer circuit 140 may provide the command CMD provided from an external entity to the control logic 150. The input/output buffer circuit 140 may provide the address ADD provided from an external entity to the control logic 150 or the row decoder 120. Also, the input/output buffer circuit 140 may output data DATA sensed and latched by the page buffer circuit 130 to an external entity.

The control logic 150 may be implemented to control the row decoder 120 and the page buffer circuit 130 in response to a command CMD transmitted from an external (the controller 200; see FIG. 1).

Also, the control logic 150 may be implemented to perform a cell count-based dynamic read operation (CDR). The control logic 150 may include a cell count comparator circuit 151 and a read level selector 152.

The cell count comparator circuit 151 may be implemented to compare a cell count value with a reference value. The cell count value may be counted by the cell counter 170. In an example embodiment, the cell count value may be an on-cell count value corresponding to an erase state. In an example embodiment, the cell count value may be an off-cell count value corresponding to a highest program state, but the cell count value in the example embodiment is not limited thereto.

The voltage generator 160 may supply various types of wordline voltages to be applied to the respective wordlines under the control of the control logic 150 and a well voltage supplied to a bulk (e.g., a well area) in which memory cells are formed. The wordline voltages applied to the respective wordlines may include a program voltage, a pass voltage, a read voltage, and read pass voltages.

The cell counter 170 may be implemented to count memory cells corresponding to a specific threshold voltage range from data sensed by the page buffer circuit 130. For example, the cell counter 170 may count the number of memory cells having a threshold voltage in a specific threshold voltage range by processing data sensed in each of the plurality of page buffers PB1-PBn and output the counting result nC to the control logic 150.

Figure 3A:
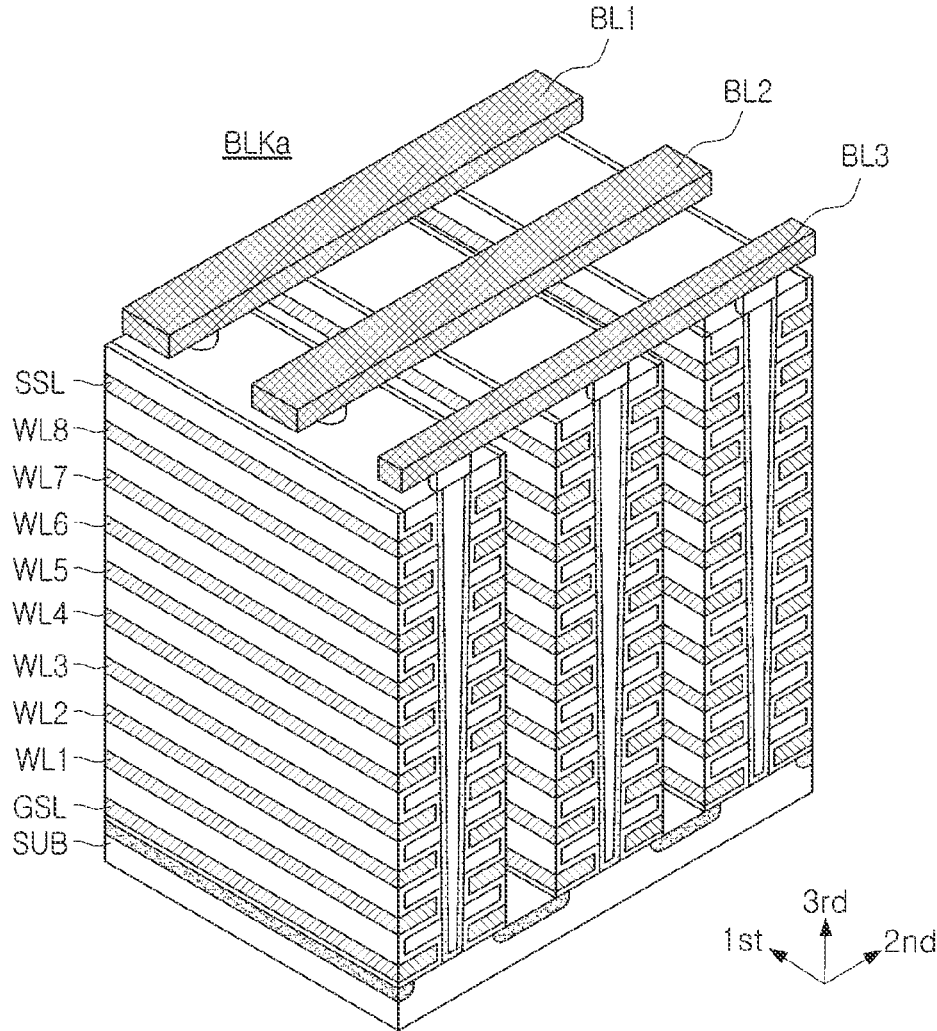
FIGS. 3A and 3B are diagrams illustrating a memory block according to an example embodiment of the present disclosure.
Figure 3B:
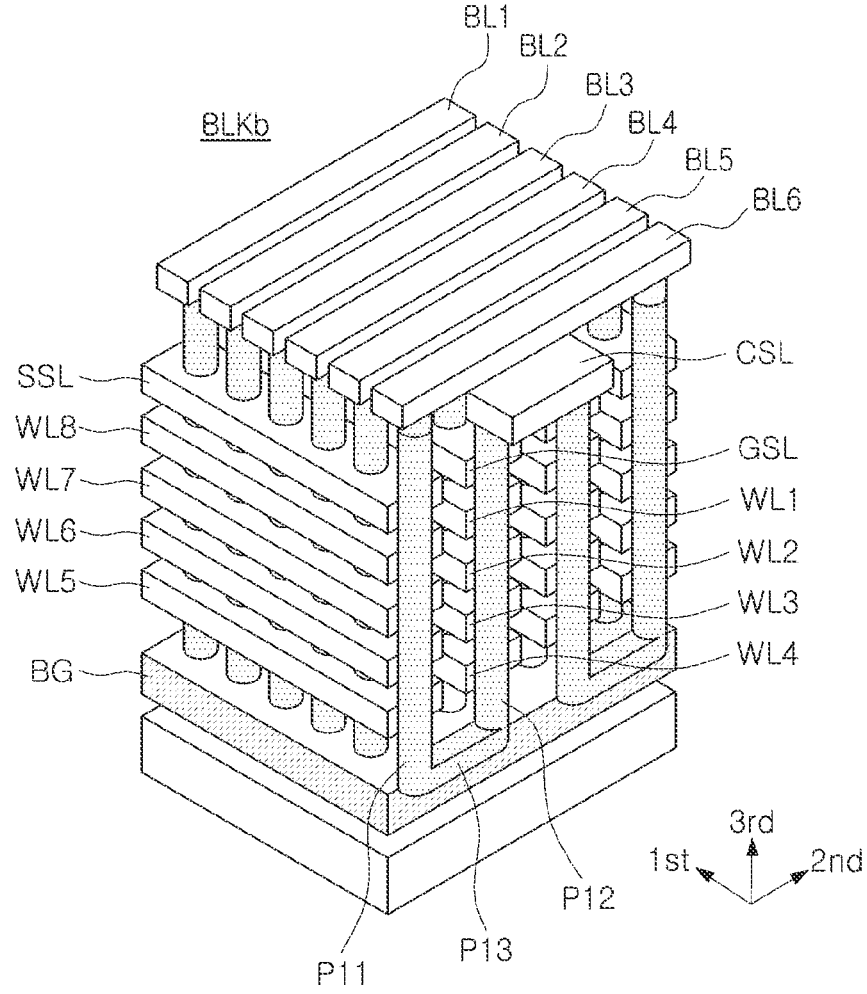

FIGS. 3A and 3B are diagrams illustrating a memory block according to an example embodiment. Referring to FIG. 3A, the memory block BLKa may be formed in a direction perpendicular to a substrate SUB. An n+ doped area may be formed in the substrate SUB.

A gate electrode layer and an insulating layer may be alternately deposited on the substrate SUB. A data storage layer may be formed between the gate electrode layer and the insulating layer. When the gate electrode layer and the insulating layer are patterned in the vertical direction, a V-shaped pillar may be formed. The pillar may be connected to the substrate SUB by penetrating through the gate electrode layer and the insulating layer. The internal region of the pillar may be configured as a filling dielectric pattern and may be filled with an insulating material such as silicon oxide. The external region of the pillar may be formed in a vertical active pattern and may be configured as a channel semiconductor. The gate electrode layer of the memory block BLKa may be connected to the ground selection line GSL, the plurality of wordlines WL1-WL8, and the string selection line SSL. Also, the pillar of the memory block BLKa may be connected to the plurality of bitlines BL1-BL3. In FIG. 3A, a single memory block BLKa may have two selection lines GSL and SSL, eight wordlines WL1-WL8, and six bitlines BL1-BL6, but an example embodiment thereof is not limited thereto.

FIG. 3B is a diagram illustrating a memory block according to another example embodiment. Referring to FIG. 3B, in the memory block BLKb, the number of layers of wordlines is four for ease of description. The memory block BLKb may be implemented in a bit cost scalable (BiCS) structure in which lower ends of adjacent memory cells connected in series are connected to each other by a pipe. The memory block BLKb may include a plurality of strings.

Each string may include memory cells connected in series. First upper ends of the memory cells may be connected to the string select transistor SST, second upper ends of the memory cells may be connected to the ground select transistor GST, and lower ends of the memory cells may be pipe-connected. The memory cells included in the string may be formed by being stacked on a plurality of semiconductor layers. Each string may include a first pillar PL11, a second pillar PL12, and a pillar connection portion PL13 connecting the first pillar PL11 to the second pillar PL12. The first pillar PL11 may be connected to the bitline (e.g., BL1) and the pillar connection portion PL13, and may be formed by penetrating a region between the string selection line SSL and the wordlines WL5-WL8. The second pillar PL12 may be connected to the common source line CSL and the pillar connection portion PL13 and may be formed by penetrating a region between the ground selection line GSL and the wordlines WL1-WL4. As illustrated in FIG. 3B, the string may be implemented in the form of a U-shaped pillar. In an example embodiment, the back-gate BG may be formed on the substrate, and the pillar connection portion PL13 may be implemented in the back-gate BG. In an example embodiment, the back-gate BG may be present in common in the block BLKb. The back-gate BG may be configured to be separated from the back-gate of another block.

Figure 4:
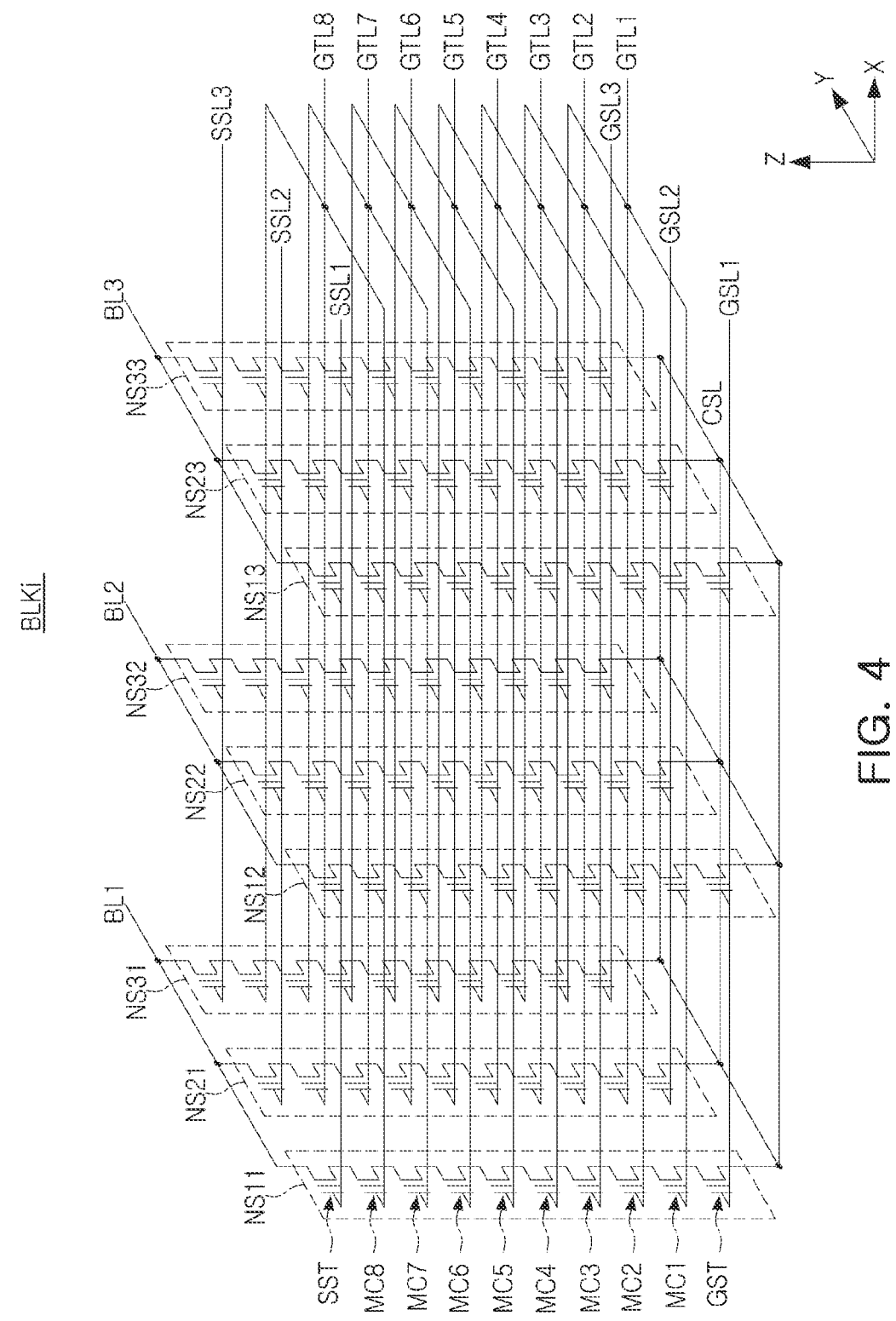
FIG. 4 is a circuit diagram illustrating a memory block according to an example embodiment of the present disclosure.

FIG. 4 is a circuit diagram illustrating a memory block BLKi (i is an integer equal to or greater than 2) according to an example embodiment. A plurality of memory NAND strings included in the memory block BLKi may be formed in a direction perpendicular to the substrate.

Referring to FIG. 4, the memory block BLKi may include a plurality of memory NAND strings NS11-NS33 connected between the bitlines BL1, BL2, and BL3 and the common source line CSL. Each of the plurality of memory NAND strings NS11-NS33 may include a string select transistor SST, a plurality of memory cells MC1, MC2, . . . , MC8, and a ground select transistor GST. Although in FIG. 4, each of the plurality of memory NAND strings NS11-NS33 may include eight memory cells MC1, MC2, . . . , MC8, an example embodiment thereof is not limited thereto. The string select transistor SST may be connected to the corresponding string selection lines SSL1, SSL2, and SSL3. The plurality of memory cells MC1, MC2, . . . , MC8 may be respectively connected to corresponding gate lines GTL1, GTL2, . . . , GTL8. The gate lines GTL1, GTL2, . . . , GTL8 may correspond to wordlines, and a portion of the gate lines GTL1, GTL2, . . . , GTL8 may correspond to dummy wordlines. The ground select transistor GST may be connected to the corresponding ground selection lines GSL1, GSL2, and GSL3. The string select transistor SST may be connected to the corresponding bitlines BL1, BL2, and BL3, and the ground select transistor GST may be connected to the common source line CSL. The wordlines (e.g., WL1) disposed on the same level may be connected in common, and the ground selection lines GSL1, GSL2, and GSL3 and the string selection lines SSL1, SSL2, and SSL3 may be separated from each other. In FIG. 4, the memory block BLK may be connected to eight gate lines GTL1, GTL2, GTL8 and three bitlines BL1, BL2, and BL3, but an example embodiment thereof is not limited thereto.

Figure 5:
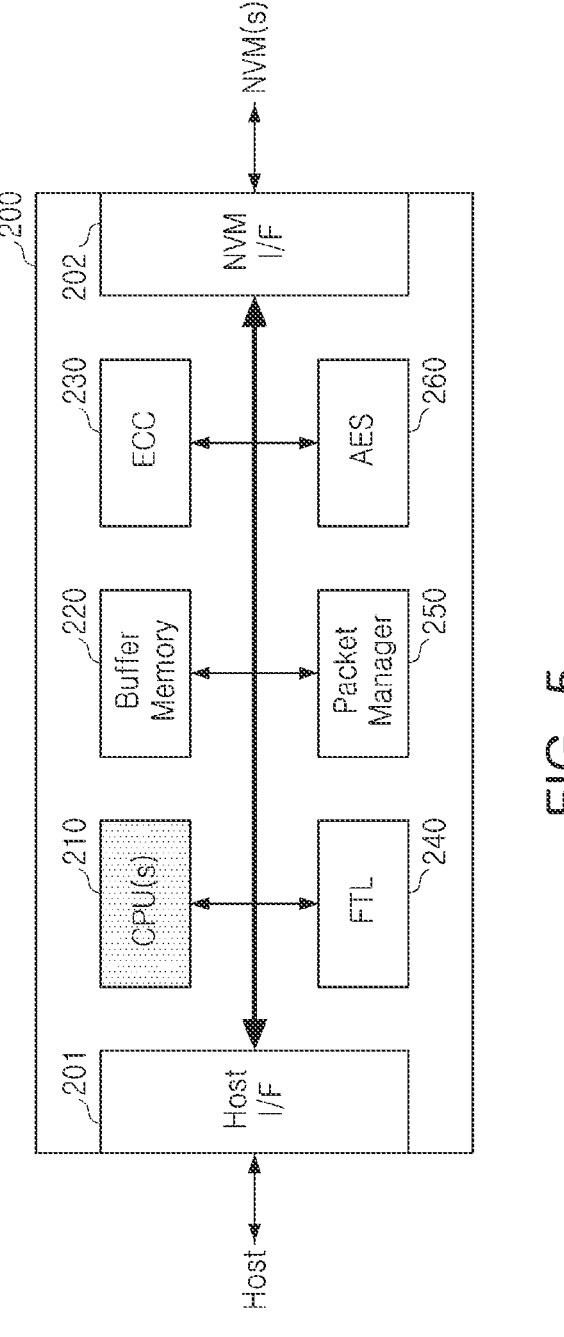
FIG. 5 is a diagram illustrating a controller according to an example embodiment of the present disclosure.

FIG. 5 is a diagram illustrating a controller 200 according to an example embodiment. Referring to FIG. 5, the controller 200 may include a host interface 201, a memory interface 202, at least one CPU 210, a buffer memory 220, an error correction circuit 230, and a flash conversion layer manager 240, a packet manager 250, and an encryption device 260.

The host interface 201 may be implemented to transmit packets to and receive packets from a host. A packet transmitted from the host to the host interface 201 may include a command or data to be written to the nonvolatile memory 100. A packet transmitted from the host interface 201 to the host may include a response to a command or data read from the nonvolatile memory 100. The memory interface 202 may transmit data to be written to the nonvolatile memory 100 to the nonvolatile memory 100 or may receive data read from the nonvolatile memory 100. The memory interface 202 may be implemented to comply with a standard protocol such as JDEC Toggle or ONFI.

A flash translation layer manager 240 may perform several functions, such as address mapping, wear-leveling, and garbage collection. The address mapping operation is one of changing a logical address received from the host into a physical address used to actually store data in the nonvolatile memory 100. Wear-leveling may be to prevent excessive degradation of a specific block by controlling blocks in the nonvolatile memory 100 to be used uniformly and may be implemented through a firmware technique for balancing erase counts of physical blocks. Garbage collection may be to secure usable capacity in the nonvolatile memory 100 by copying valid data of a block into a new block and erasing an existing block.

The packet manager 250 may generate a packet according to a protocol of an interface negotiated with a host or may parse various information from the packet received from the host. Also, the buffer memory 216 may temporarily store data to be written to the nonvolatile memory 100 or data read from the nonvolatile memory 100. In an example embodiment, the buffer memory 220 may be configured to be provided in the controller 200. In another example embodiment, the buffer memory 220 may be disposed externally of the controller 200.

The encryption device 260 may perform at least one of an encryption operation and a decryption operation for data input to the storage controller 210 using a symmetric-key algorithm. The encryption device 260 may perform encryption and decryption of data using an advanced encryption standard (AES) algorithm. The encryption device 260 may include an encryption module and a decryption module.

Figure 6A:
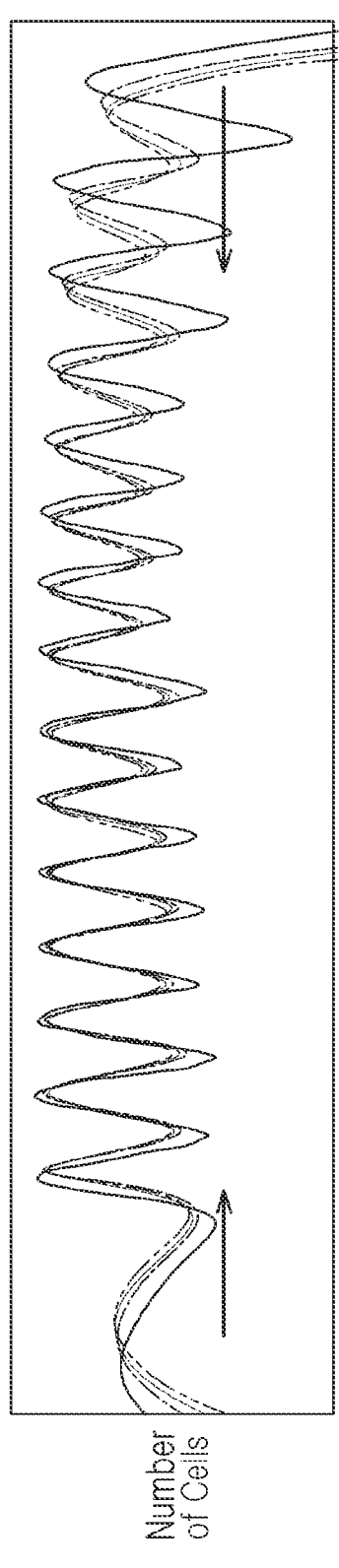
FIGS. 6A, 6B, 6C, and 6D are diagrams illustrating the necessity of a cell count-based dynamic read operation according to an example embodiment of the present disclosure.

FIGS. 6A, 6B, 6C, and 6D are diagrams illustrating the necessity of a cell count-based dynamic read operation according to an example embodiment. FIG. 6A illustrates changes in distribution over time after an operation of a 4-bit memory cell. In the nonvolatile memory device, when time elapses after the program operation, charge loss may occur due to vertical charge loss of electrons illustrated in FIG. 6C and lateral migration of holes illustrated in FIG. 6D. Accordingly, threshold voltage distribution may shift.

Figure 6B:
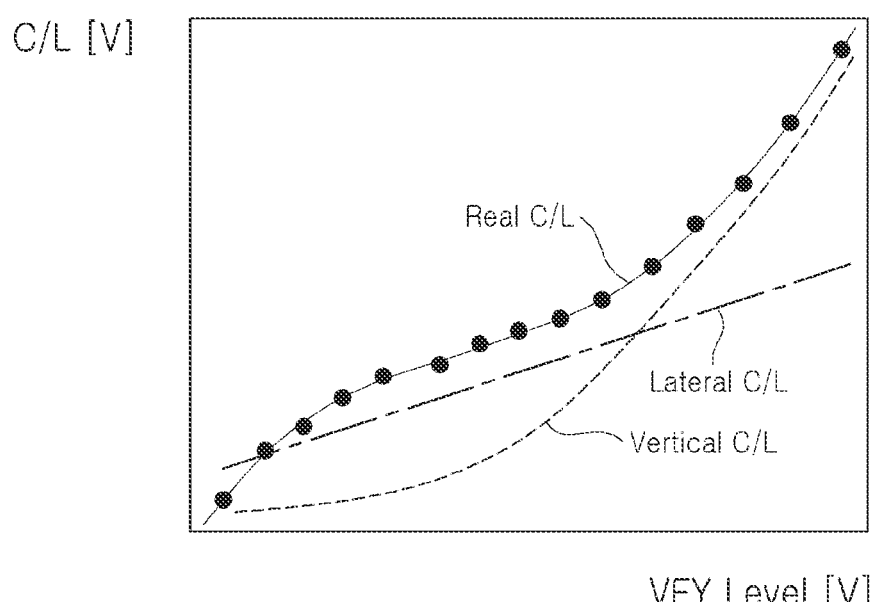
Figure 6C:
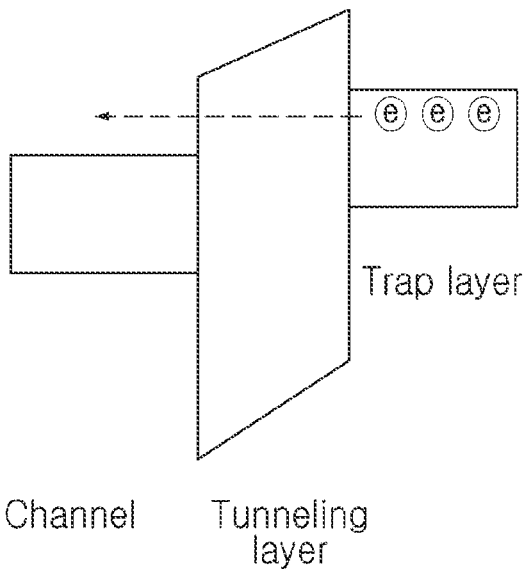
Figure 6D:
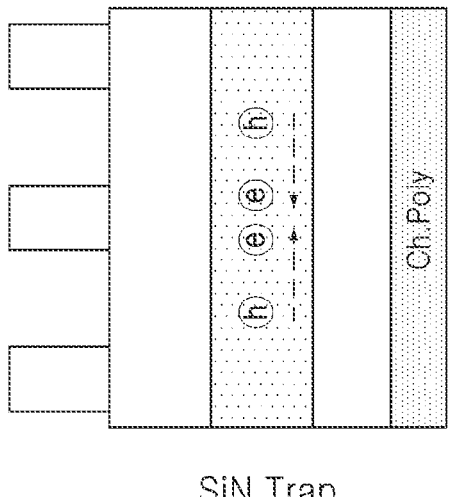

As illustrated in FIG. 6B, the distribution shift may have different aspects in each state. For example, in the lower state, lateral migration of holes may occur relatively greatly, and in the upper state, the vertical charge loss of electrons may occur relatively greatly. Due to such the distribution shift, a read failure may occur when a read operation is performed without properly finding a read level reducing an error bit. Also, it may be difficult to correct the optimal read level according to the distribution shift to be a linear line according to a regression analysis, which may deteriorate the read performance of the nonvolatile memory device and may shorten the retention time guaranteed by the nonvolatile memory device. Also, as a multi-bit (3-bit, 4-bit, 5-bit, 6-bit or more) technology to improve bit density is implemented or the number of stacks increases, such a phenomenon may increase in a microprocess in which Lg/Ls, a cell size, is scaled down. Therefore, it may be necessary to apply the optimal read level to the states according to the factor causing the charge loss to reduce the error bit.

Figure 7A:
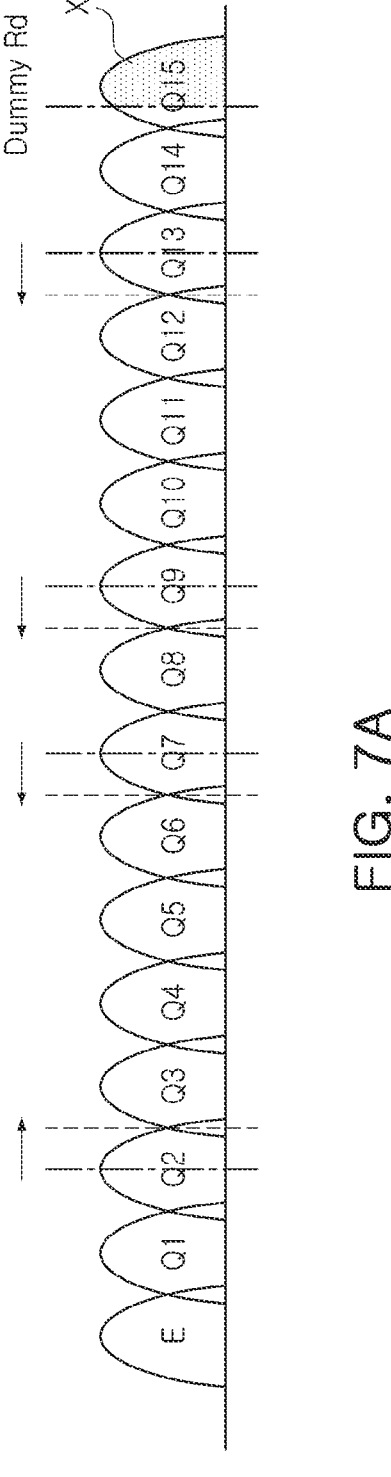
FIGS. 7A, 7B, and 7C are diagrams illustrating a general method of correcting a read level based on off-cell count information in an optimal state.
Figures 7B, 7C:
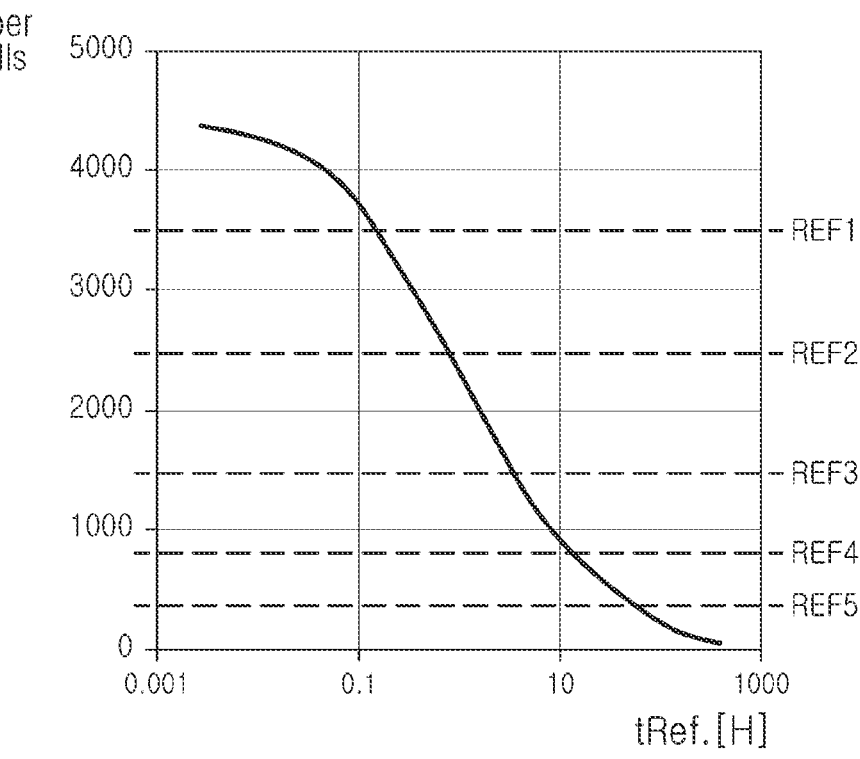

FIGS. 7A, 7B, and 7C are diagrams illustrating a general method of correcting a read level based on off-cell count information in an optimal state.

Referring to FIG. 7A, an off-cell count value (X) for the highest program state (Q15) among 16 states (E, Q1-Q15) of a quadruple level cell (QLC) may be obtained through a dummy read operation. As for the off-cell count value X, case Case1-Case6 may be determined by reference values REF1-REF5 illustrated in FIG. 7B. Referring to FIG. 7C, as a case is determined according to the off-cell count value X, the read level offsets OST1-OST6 may be determined.

The general method of compensating a read level may apply the optimal read level to all states (E, Q1-Q15) using off-cell count information of the highest state Q15. However, there may be a limitation in optimizing the read levels of all states only using a single highest state. Also, as described in FIGS. 6A to 6B, the upper states may be mainly deteriorated by the vertical charge loss of electrons, but the lower states may be mainly deteriorated by the charge loss caused by the lateral migration of holes. Accordingly, when the on-cells of the highest state Q15 are present in the adjacent pattern, as electrons cause vertical charge loss, there may be no causal relationship with the distribution deterioration phenomenon of the lower state.

The nonvolatile memory device in an example embodiment may correct the read level for major states in which electron vertical charge loss occurs using the cell count-based dynamic read (CDR) of the highest state and for states caused by hole lateral charge loss using the CDR in an erase state, thereby improving reliability of data.

In the read method of the storage device 10 (see FIG. 1) in an example embodiment, a plurality of read level sets determined by the controller 200 (see FIG. 1) may be transmitted to the nonvolatile memory device 100 (see FIG. 1) and the highest state (e.g., Q15) and the erase state (E) may be performed as dummy read (the dummy read operation may be hidden using a pipe line when the number of bits increases to 4 bit, 5 bit, and 6 bit).

Figure 8:
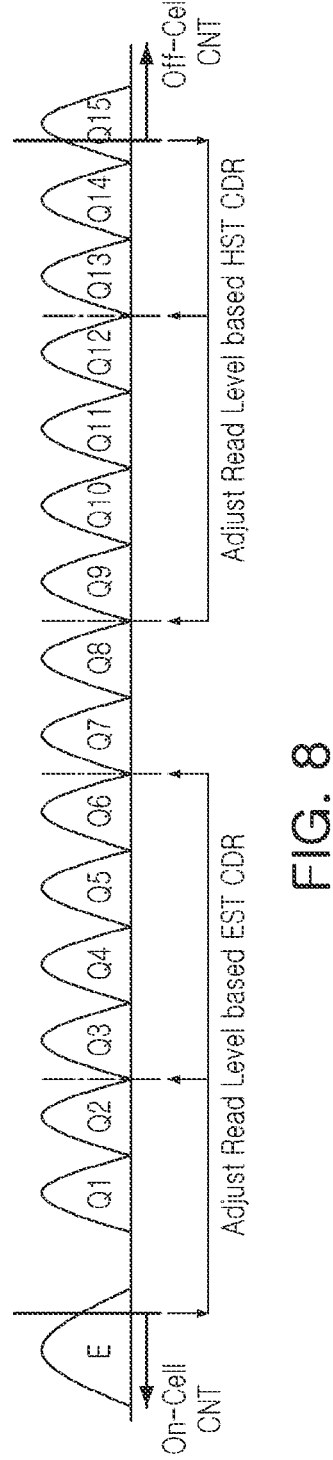
FIG. 8 is a diagram illustrating a cell count-based dynamic read operation of a storage device according to an example embodiment of the present disclosure.

FIG. 8 is a diagram illustrating a cell count-based dynamic read operation of a storage device 10 according to an example embodiment. In FIG. 8, the memory cell will be referred to as QLC for ease of description.

In an example embodiment, in the upper states (e.g., Q8-Q15 in QLC) in which deterioration due to vertical loss of electrons is major, a read level may be corrected using off-cell count information of the highest state (Q15).

In an example embodiment, in the lower states (e.g., E, Q1-Q7 in QLC) in which deterioration due to lateral migration of the hole is major, the read level may be corrected using the on-cell count information of the erase state (E).

As illustrated in FIG. 8, the read method of the storage device 10 may reduce a read error for all states using the above-described off-cell count information (first count information) of the highest state Q15 and on-cell count information (second count information) of the erase state E and may perform a read operation by selecting the read level in run-time.

Figure 9A:
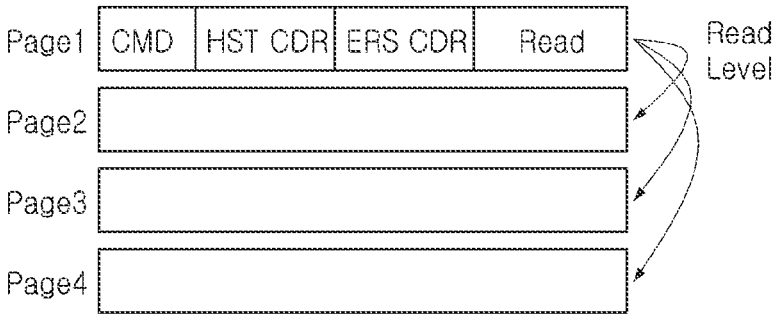
Figure 9B:
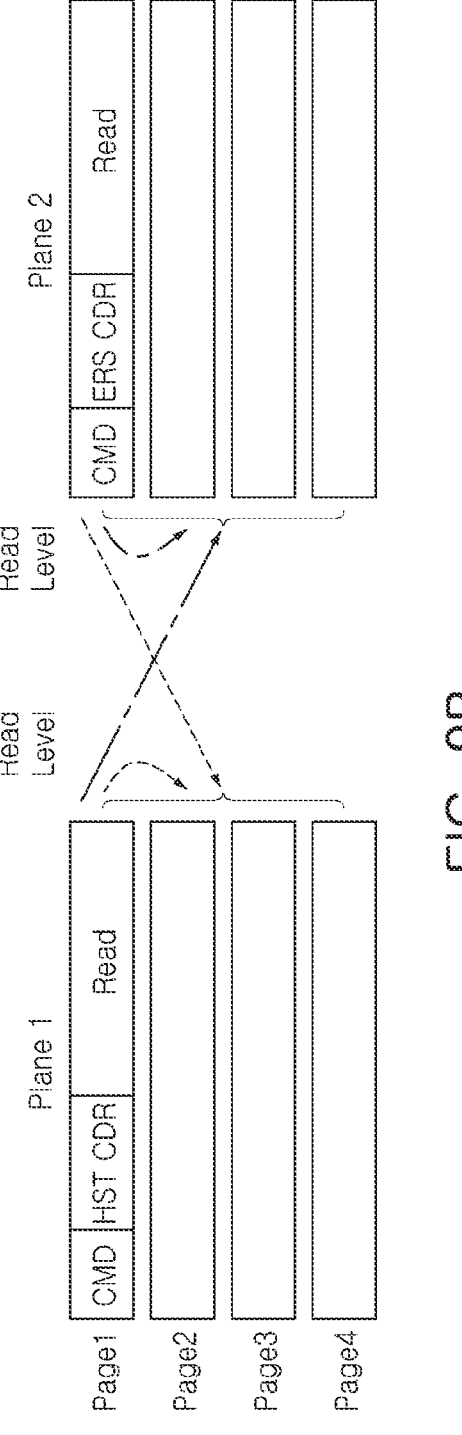
Figure 9C:
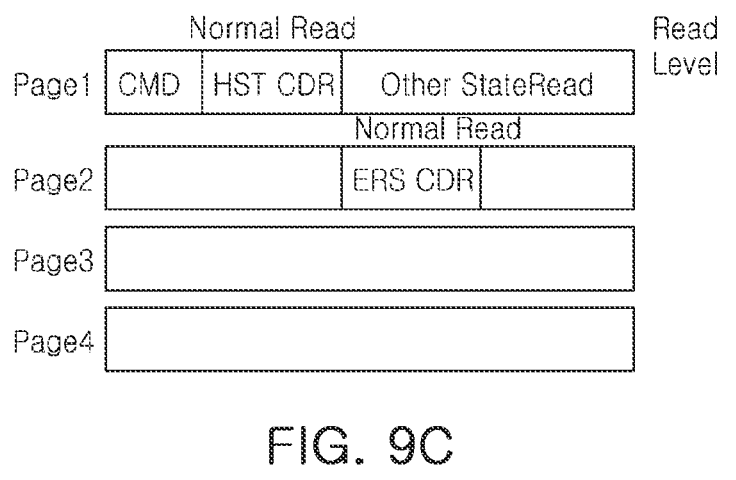

FIGS. 9A, 9B, and 9C are diagrams illustrating various methods of a cell count operation with respect to a highest state and an erase state according to an example embodiment. Hereinafter, it will be assumed that four logical pages are present in a single wordline for ease of description.

Referring to FIG. 9A, at least one read level of other pages may be corrected using an extra read operation in a single page on the same plane and in the same wordline. For example, after receiving the command CMD from a first page, an extra read operation (HST CDR and ERS CDR) may be performed, and thereafter, a read operation may be performed with a read level changed according to the extra read operation. The extra read operation may include a cell count-based dynamic read operation (HST CDR) for the highest state and a cell count-based dynamic read operation (ERS CDR) for the erase state.

Referring to FIG. 9B, read levels of other pages may be corrected using an extra read operation in a single page of the same wordline on another plane. For example, a cell count-based dynamic read operation (HST CDR) for the highest state is performed on the first plane and a read level of at least one of the other pages of the first plane and the second plane according to the result of the cell count-based dynamic read operation HST CDR for the highest state. Conversely, for example, a cell count-based dynamic read operation (ERS CDR) for the erase state may be performed on the second plane, and a read level of the at least one of the other pages of the first plane and the second plane may be corrected according to the result of the cell count-based dynamic read operation ERS CDR for the erase state.

Referring to FIG. 9C, by using a normal read in two pages including the highest state and the erase state of the same wordline on the same plane, at least one read level of the other pages may be corrected. For example, in the normal read of the first page, the cell count-based dynamic read operation HST CDR for the highest state may be simultaneously performed. That is, when the memory cell is QLC, off-cell count information of the highest state Q15 may be stored while performing a normal read operation for reading the highest state Q15. Also, in the normal read of the second page, the cell count-based dynamic read operation ERS CDR for the erase state may be performed. That is, when the memory cell is QLC, the on-cell count information of the erase state E may be stored while performing the normal read operation for reading the highest state Q15.

The cell count operation for the highest state and the erase state in an example embodiment is not limited to the above-described examples.

Figures 10A, 10B, 10C:
FIGS. 10A, 10B, and 10C are diagrams illustrating a timing diagram, parameters, and a read level offset table related to a cell count-based dynamic read operation according to an example embodiment of the present disclosure.

FIGS. 10A, 10B, and 10C are diagrams illustrating a timing diagram, parameters, and a read level offset table related to a cell count-based dynamic read operation according to an example embodiment.

Referring to FIG. 10A, the nonvolatile memory device 100 may receive a cell count-based dynamic read command CDR CMD from the controller 200, may receive an address ADD to perform a read operation, and may receive a parameter PRMT and a read level offset table RLOST. The parameter PRMT may include reference values C1-C5 determining the range of the cell count (off-cell count or on-cell count) as illustrated in FIG. 10B. Also, the read level offset table RLOST may include a plurality of read level offset values OFS1-OFS24. However, the read level offset values OFS1-OFS24 may correspond to the range of the cell count. The number of parameters PRMT and the number of read level offset values are not limited thereto.

Figure 11A:
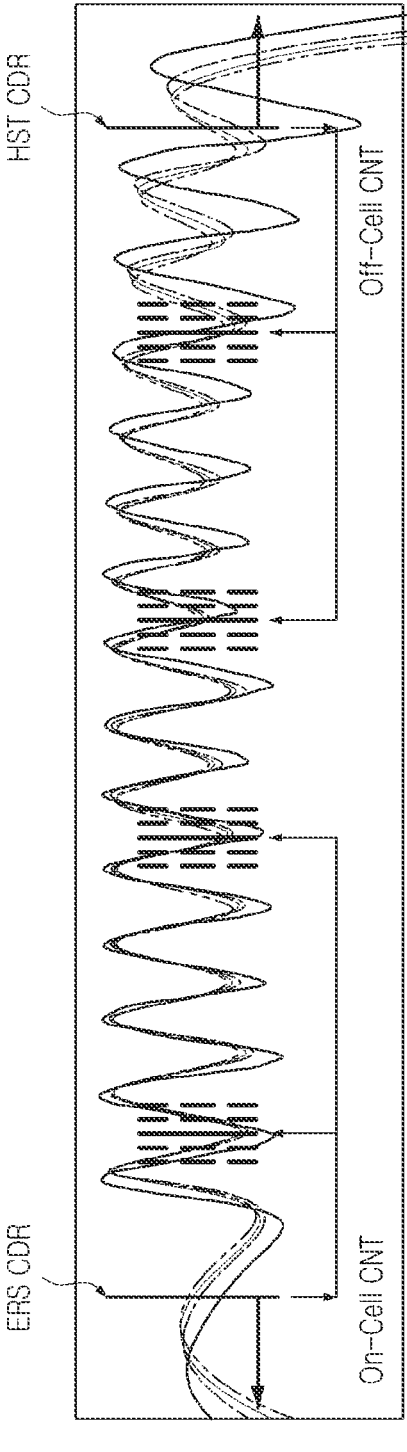

FIGS. 11A and 11B are diagrams illustrating changing of a read level in a cell count-based dynamic read operation of a nonvolatile memory device 100 according to an example embodiment. Referring to FIG. 11A, off-cell count information may be obtained through a cell count-based dynamic read operation HST CDR for the highest state or on-cell count information may be obtained through a cell count-based dynamic read operation ERS CDR for an erase state.

Referring to FIG. 11B, read level sets may be selected according to the range of the cell count value OCC. The cell count value OCC may be an off-cell count value or an on-cell count value.

In an example embodiment, when the cell count value OCC exceeds the first reference value C1, the first read level set RLS1 may be selected. In an example embodiment, when the cell count value OCC is greater than the second reference value C2 and equal to or less than the first reference value C1, the second read level set RLS2 may be selected. In an example embodiment, when the cell count value OCC is greater than the third reference value C3 and equal to or less than the second reference value C2, the third read level set RLS3 may be selected. In an example embodiment, when the cell count value OCC is greater than the fourth reference value C4 and equal to or less than the third reference value C3, the fourth read level set RLS4 may be selected. In an example embodiment, when the cell count value OCC is greater than the fifth reference value C5 and equal to or less than the fourth reference value C4, the fifth read level set RLS5 may be selected. In an example embodiment, when the cell count value OCC is equal to or less than the fifth reference value C5, the sixth read level set RLS6 may be selected.

However, the number of cell count ranges and the number of read level sets are not limited to the above-described example. That is, the number of the off-cell count period or the number of the on-cell count period will not be limited to six. Also, the selected read level offset for each state will not be limited to one of six. For example, the number of read level offset group per each page may be three or four.

However, the memory cell in an example embodiment is not limited to QLC. The memory cell in an example embodiment may be applicable to a triple level cell (TLC), a penta-level cell (PLC), and a hexa-level cell (HLC; a 6-bit cell).

Figure 12A:
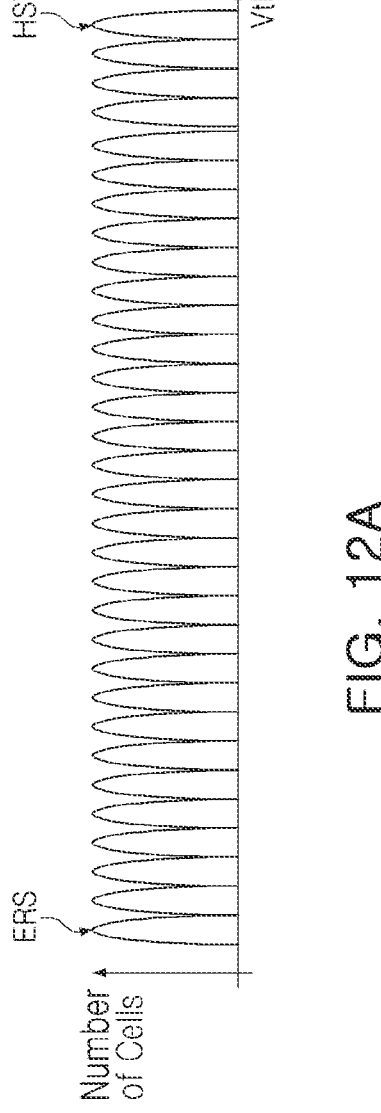
FIG. 12A is a diagram illustrating 32 states of a PLC.
Figure 12B:
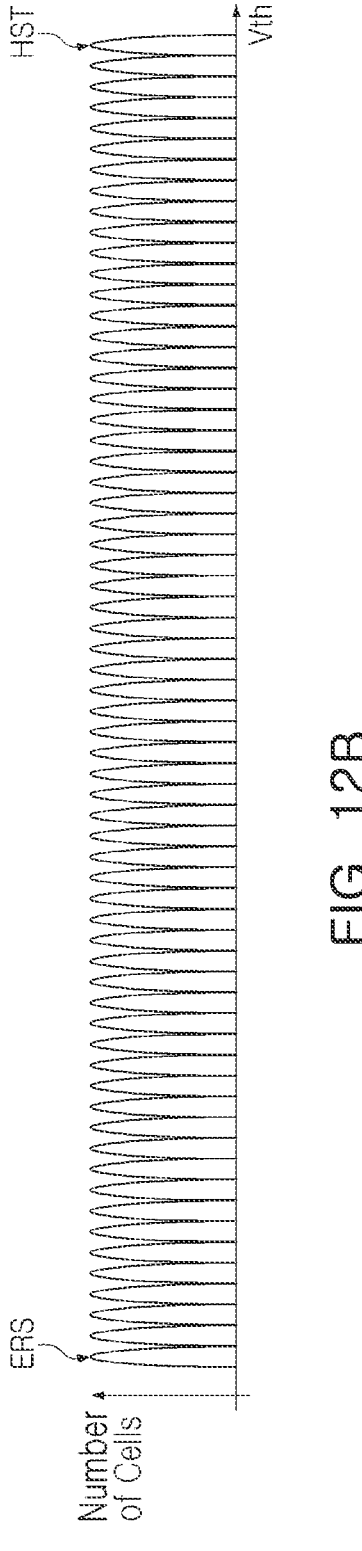
FIG. 12B is a diagram illustrating 64 states of an HLC.

FIG. 12A is a diagram illustrating 32 states of PLC, and FIG. 12B is a diagram illustrating 64 states of HLC. As illustrated in FIGS. 12A and 12B, read levels for the other states may be compensated using cell count information for the erase state ERS and the highest state HST.

Figure 13:
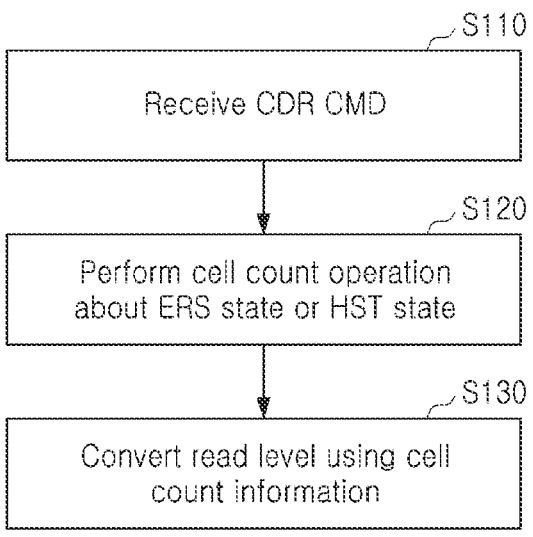
FIG. 13 is a flowchart illustrating a method of operating a nonvolatile memory device according to an example embodiment of the present disclosure.

FIG. 13 is a flowchart illustrating a method of operating a nonvolatile memory device 100 according to an example embodiment. Referring to FIGS. 1 to 13, the nonvolatile memory device 100 may operate as below.

The nonvolatile memory device 100 may receive a CDR command from the controller 200 (S110). The nonvolatile memory device 100 may perform a cell count operation for the highest state HST or an erase state ERS in response to the CDR command. For example, an off-cell count operation (first cell count operation) for the highest state HST may be performed and an on-cell count operation (second cell count operation) for the erase state ERS may be performed (S120). Thereafter, the nonvolatile memory device 100 may change the read level using cell count information according to the cell count operation (S130). Thereafter, the nonvolatile memory device 100 may perform a read operation using the changed read level.

Figure 14:
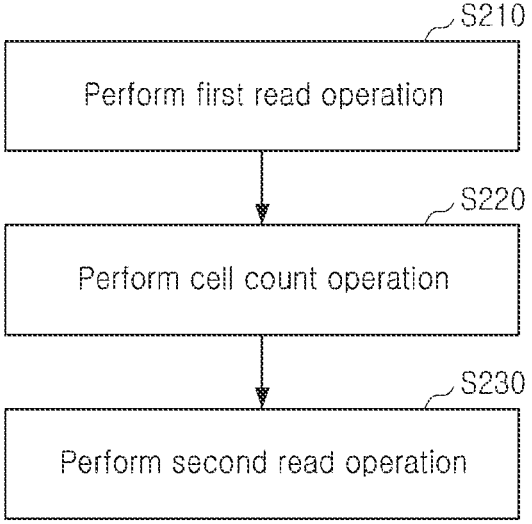
FIG. 14 is a flowchart illustrating a method of operating a nonvolatile memory device according to an example embodiment of the present disclosure.

FIG. 14 is a flowchart illustrating a method of operating a nonvolatile memory device 100 according to an example embodiment. Referring to FIGS. 1 to 12 and 14, the nonvolatile memory device 100 may operate as below.

The nonvolatile memory device 100 may perform a first read operation in response to a read command (S210). When the first read operation fails, the nonvolatile memory device 100 may perform a cell count operation for the highest state HST/erase state ERS (S220). The read level may be optimally changed according to the cell count operation. The read level change may be performed in the nonvolatile memory device 100 or externally of the nonvolatile memory device 100. Thereafter, the nonvolatile memory device 100 may perform a second read operation in response to the read command (S230).

Figure 15:
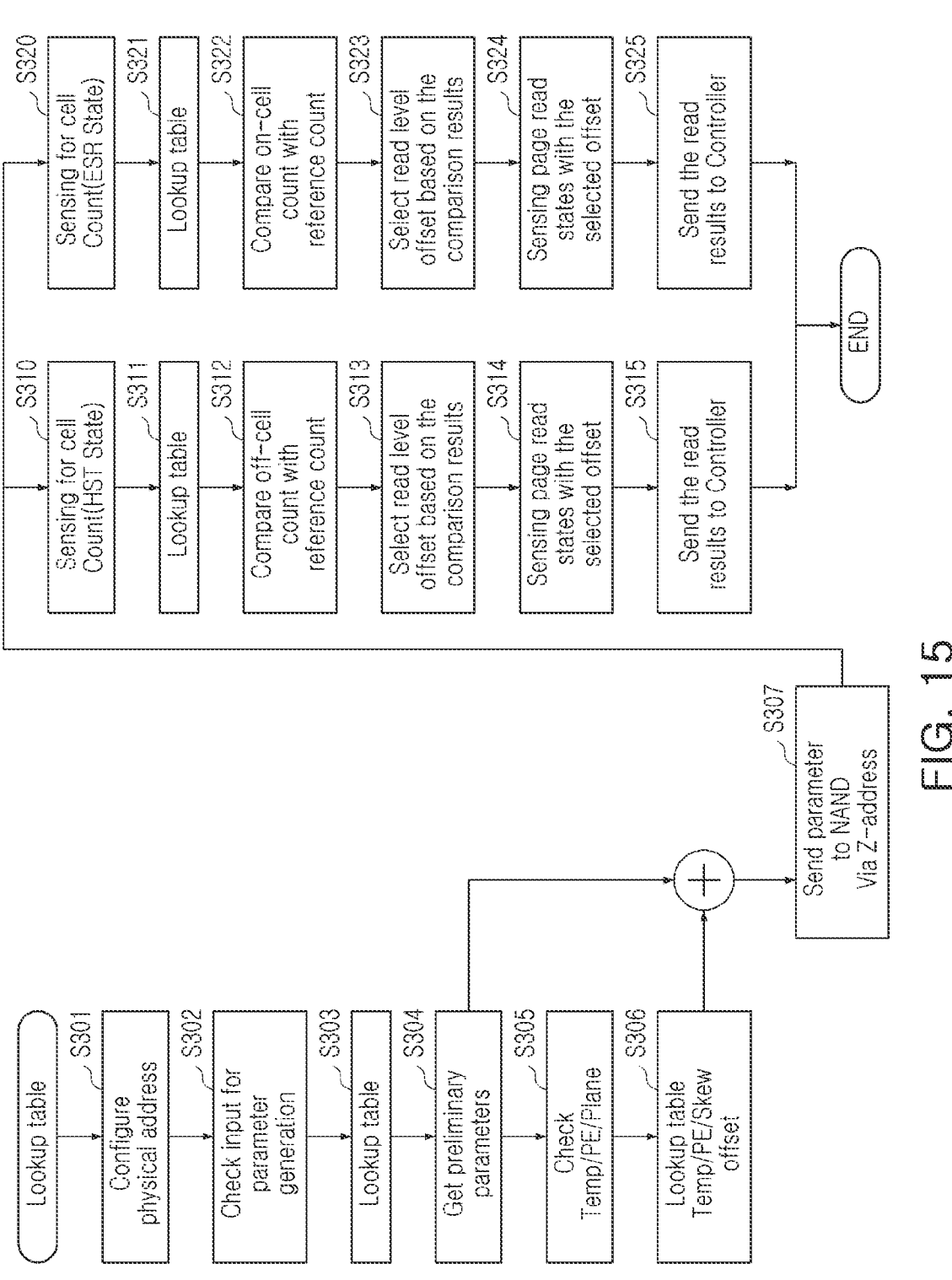
FIG. 15 is a flowchart illustrating a reading method of a storage device according to an example embodiment of the present disclosure.

FIG. 15 is a flowchart illustrating a reading method of a storage device according to an example embodiment. Referring to FIGS. 1 to 15, the read method of the storage device 10 may be performed as below.

The controller 200 of the storage device 10 may receive a read request from the host. The read request may include a logical address storing data to be read. The controller 200 may convert the logical address into a physical address in response to the read request (S301). For example, a physical address corresponding to the logical address may be configured in the flash translation layer of the controller 200.

The controller 200 may check inputs for generating parameters related to the CDR operation (S302). The inputs may be information related to a wordline, a memory block, a chip, or a die stack. The controller 200 may store a lookup table related to the read level offset in the buffer memory 220 (S303).

The controller 200 may obtain preliminary parameters for the CDR operation (S304). The preliminary parameters may include information on a read offset, a reference cell count, or the highest state HST/erase state ERS for a cell count operation. The controller 200 may check temperature/PE cycle/plane information (S305). The controller 200 may read the relevant lookup table. Here, the lookup table contains the temperature/PE cycle/skew offset.

The controller 200 may transmit a parameter for the CDR operation to the nonvolatile memory device 100 through the Z-address (S307).

The CDR operation may include a first sensing operation according to an off-cell count operation (first cell count operation) for the highest state HST and a second sensing operation according to an on-cell count operation (second cell count) for the erase state ERS.

The first sensing operation reflecting the first cell count information of the highest state HST may be performed as below. A sensing operation may be performed for the off-cell count of the highest state HST (etc., Q15 in FIG. 8) (S310). A lookup table related to the read level offset may be read (S311). The lookup table may be transmitted from the controller 200. The off-cell count value for the highest state HST may be compared with a reference count value (S312). A read level offset may be selected from the lookup table according to a result of the comparison (S313). Page read states may be sensed with the selected read level offset (S314). Page data according to the read result may be transmitted to the controller 200 (S315).

The second sensing operation reflecting the second cell count information for the erase state ERS may be performed as below. A sensing operation may be performed for the on-cell count of the erase state EST (etc., E in FIG. 8) (S320). A lookup table related to the read level offset may be read (S321). The on-cell count value for the erase state ERS may be compared with a reference count value (S322). A read level offset may be selected from the lookup table according to a result of the comparison (S323). Page read states may be sensed with the selected read level offset (S324). Page data according to the read result may be transmitted to the controller 200 (S325). Thereafter, the CDR operation may be completed.

Figure 16:
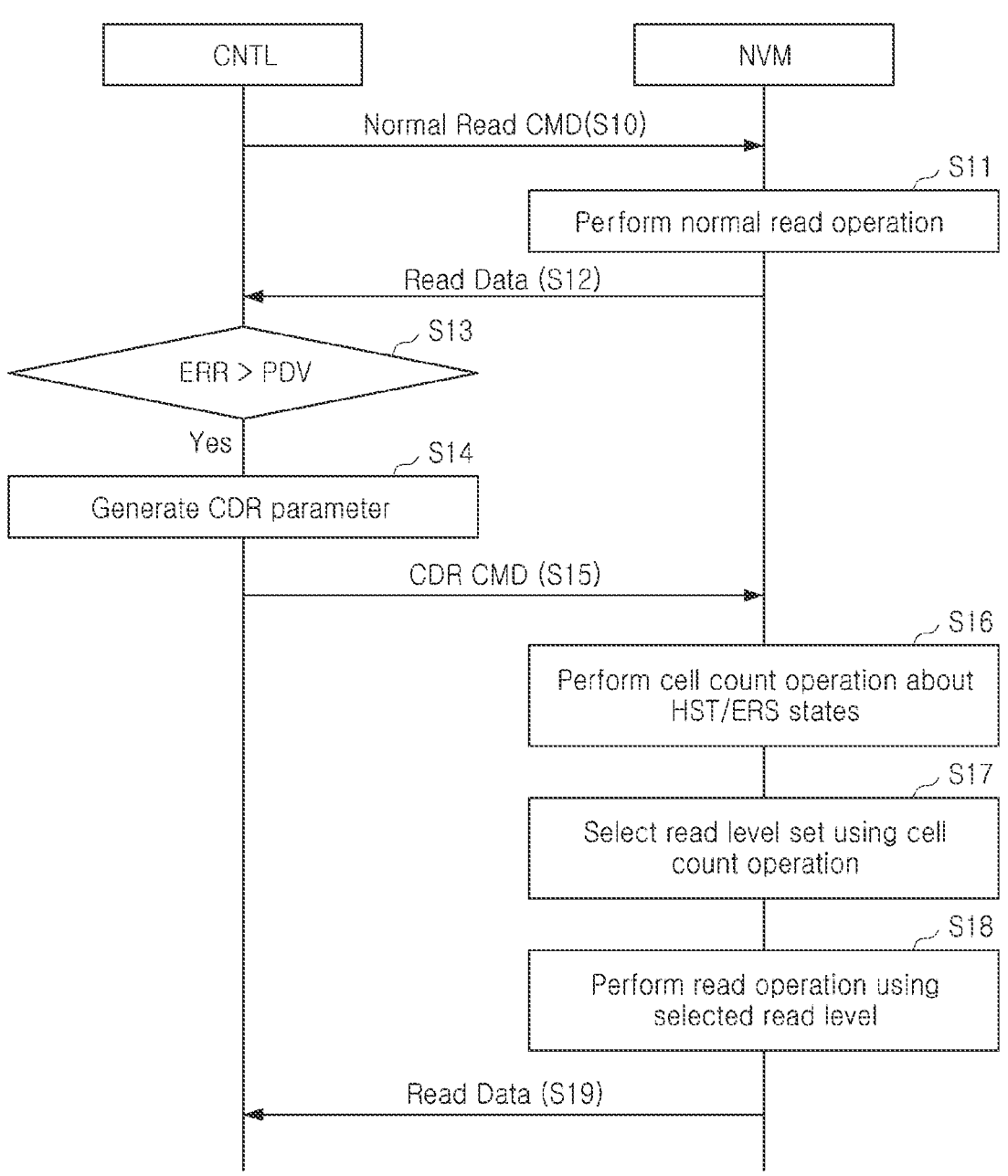
FIG. 16 is a ladder diagram illustrating a reading method of a storage device according to an example embodiment of the present disclosure.

FIG. 16 is a ladder diagram illustrating a reading method of a storage device according to an example embodiment. Referring to FIGS. 1 to 16, a method of reading a storage device may be performed as below.

A normal read command may be transmitted from the controller CNTL to the nonvolatile memory device NVM (S10). The nonvolatile memory device NVM may receive a normal read command and may perform a normal read operation in response to the normal read command (S11). In the normal read operation, read data may be transmitted to the controller CNTL (S12).

The controller CNTL may receive the read data and may determine whether the error number ERR of the read data is greater than the reference value PDV (S13). When the error number ERR of the read data is greater than the reference value PDV, the controller CNTL may generate a CDR parameter related to a CDR operation (S14). The CDR parameter may include reference values (e.g., C1-C5 in FIG. 11B) determining the offset correction range. The controller CNTL may generate the CDR commands.

The CDR command may be transmitted from the controller CNTL to the nonvolatile memory device NVM (S15). The nonvolatile memory device NVM may perform a CDR operation in response to the CDR command. The nonvolatile memory device NVM may perform a cell count operation for the highest state HST/erase state ERS (S16). Thereafter, the nonvolatile memory device NVM may select a read level set using cell count information according to a cell count operation (S17). Thereafter, the nonvolatile memory device NVM may perform a read operation using the selected read level set (S18). Read data according to the read operation may be transmitted to the controller CNTL (S19).

The nonvolatile memory device NVM in an example embodiment may transmit the cell count information to the controller CNTL, the controller CNTL may determine an optimal read level offset using the transmitted cell count information, and the nonvolatile memory device NVM may perform a read operation using the determined read level offset.

Figure 17:
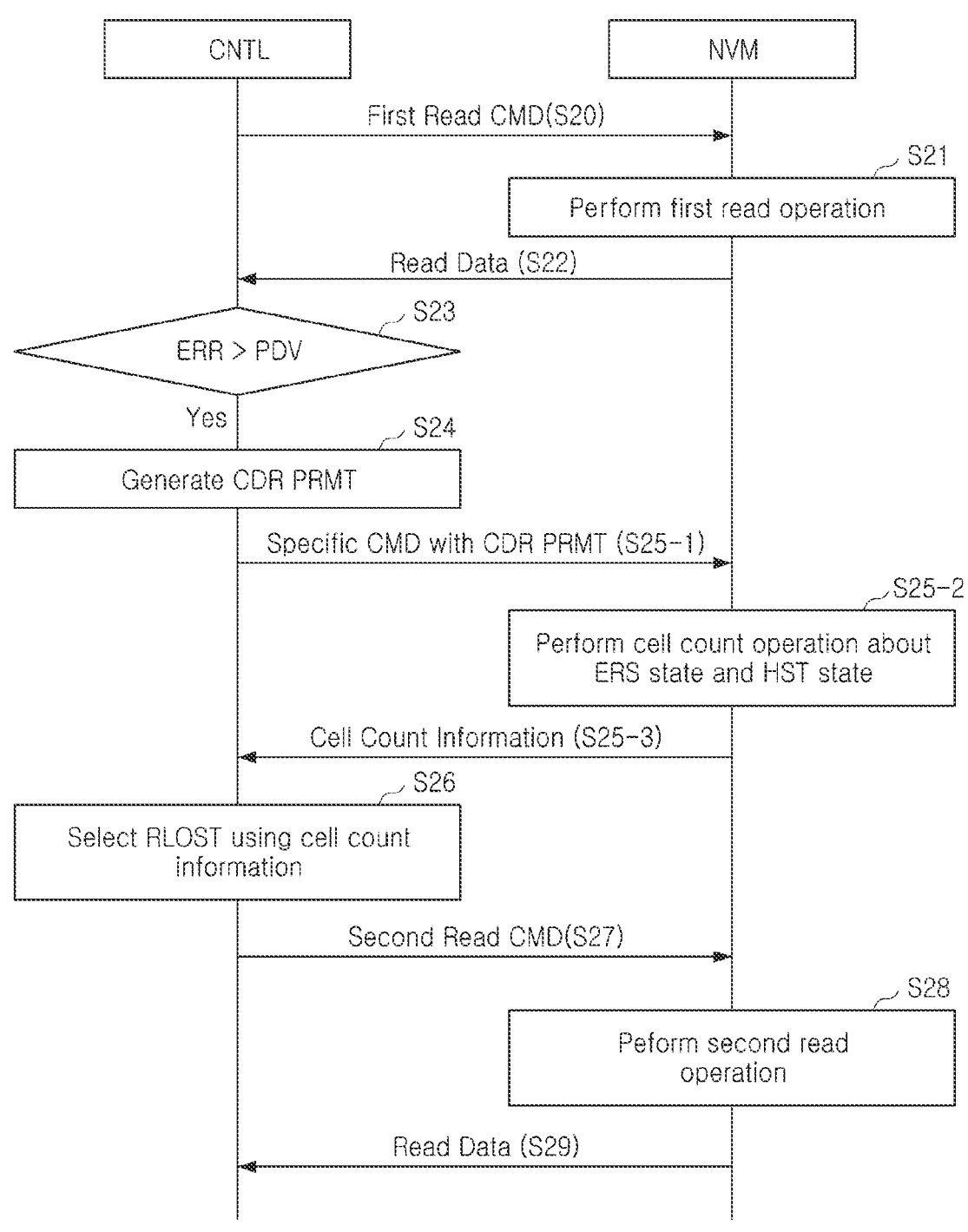
FIG. 17 is a ladder diagram illustrating a reading method of a storage device according to an example embodiment of the present disclosure.

FIG. 17 is a ladder diagram illustrating a reading method of a storage device according to an example embodiment. Referring to FIGS. 1 to 15 and 17, the method of reading the storage device may be performed as below.

A first read command may be transmitted from the controller CNTL to the nonvolatile memory device NVM (S20). The nonvolatile memory device NVM may receive the first read command and may perform a first read operation in response to the first read command (S21). In the first read operation, read data may be transmitted to the controller CNTL (S22).

The controller CNTL may receive the read data and may determine whether the error number ERR of the read data is greater than the reference value PDV (S23). When the error number ERR of the read data is greater than the reference value PDV, the controller CNTL may generate a CDR parameter related to the CDR operation (S24). The controller CNTL may issue specific commands with CDR parameters.

The specific command may be transmitted from the controller CNTL to the nonvolatile memory device NVM (S25-1). The nonvolatile memory device NVM may perform a cell count operation in response to the specific command. For example, the nonvolatile memory device NVM may perform a cell count operation for the highest state HST/erased state ERS (S25-2). Cell count information according to the cell count operation may be transmitted from the nonvolatile memory device NVM to the controller CNTL (S25-3).

Thereafter, the controller CNTL may select an optimal read level offset lookup table RLOST using the cell count information (S26). The controller CNTL may issue a second read command. The second read command may include offset information corresponding to the optimal read level offset lookup table RLOST.

The second read command may be transmitted from the controller CNTL to the nonvolatile memory device NVM (S27). The nonvolatile memory device NVM may perform a second read operation in response to the second read command (S28). Read data according to the read operation may be transmitted to the controller CNTL (S29).

The storage device in an example embodiment may perform a read operation in connection with an on-chip valley search (OVS) operation. The OVS operation will be described in greater detail in US 2020-0098436, U.S. Pat. Nos. 10,090,046, 10,559,362, 10,607,708, and 10,629,259, which are incorporated herein by reference.

Figure 18:
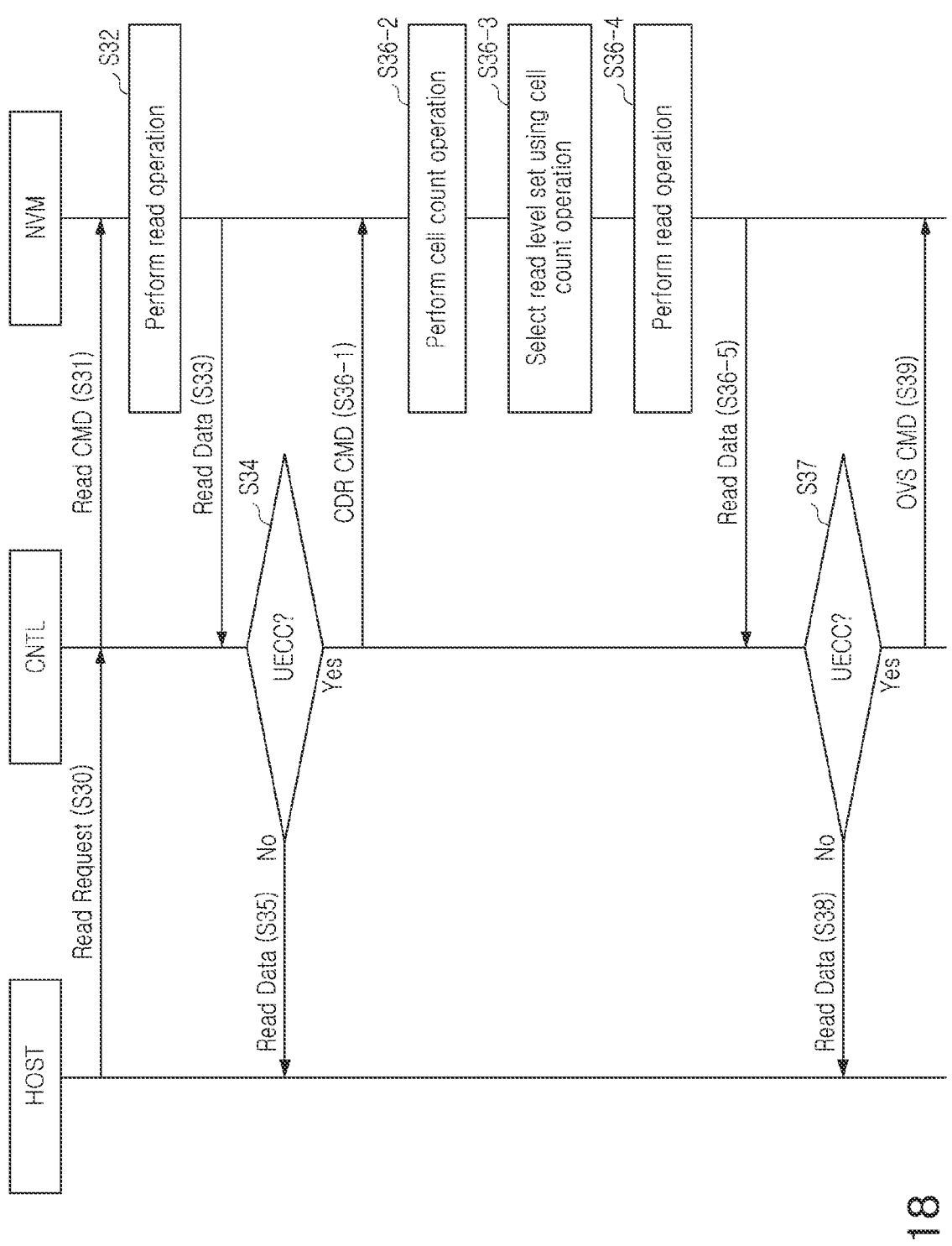
FIG. 18 is a ladder diagram illustrating a reading method of a storage device according to an example embodiment of the present disclosure.

FIG. 18 is a ladder diagram illustrating a reading method of a storage device according to an example embodiment. Referring to FIGS. 1 to 13 and 15, a read operation of the storage device may be performed as below.

The host may transmit a read request to the controller CNTL of the storage device (S30). The controller CNTL may receive a read request, may issue a read command, and may transmit the read command to the nonvolatile memory NVM (S31). The nonvolatile memory device NVM may perform a read operation in response to a read command (S32). The read data of the read operation may be transmitted to the controller CNTL (S33).

The controller CNTL may determine whether an error of read data is uncorrectable UECC (S34). When an error of read data is correctable, that is, when the correction of error of read data is possible, the error of read data may be corrected and the read data may be output to the host (S35). When an error of read data is uncorrectable, the controller CNTL may generate a CDR parameter, may issue a CDR command, and may transmit the CDR command to the nonvolatile memory device NVM together with the CDR parameter and the read level offset lookup table RLOST (S36-1).

The nonvolatile memory device NVM may perform a cell count operation in response to the CDR command (S36-2). A read level set may be selected using cell count information according to the cell count operation (S36-3). The nonvolatile memory device NVM may perform a read operation using the selected read level set (S36-4). The read data of the read operation may be transmitted to the controller CNTL (S36-5).

The controller CNTL may determine whether an error of read data is uncorrectable UECC. (S37). When an error of read data is correctable, the error of read data may be corrected and the read data may be transmitted to the host (S38). When an error of read data is not correctable, the controller CNTL may issue an OVS command for performing an OVS operation and may transmit the OVS command to the nonvolatile memory device NVM (S39). The nonvolatile memory device NVM may perform an OVS operation according to the OVS command.

The storage device in an example embodiment may include an artificial intelligence processor for generating CDR parameters.

Figure 19:
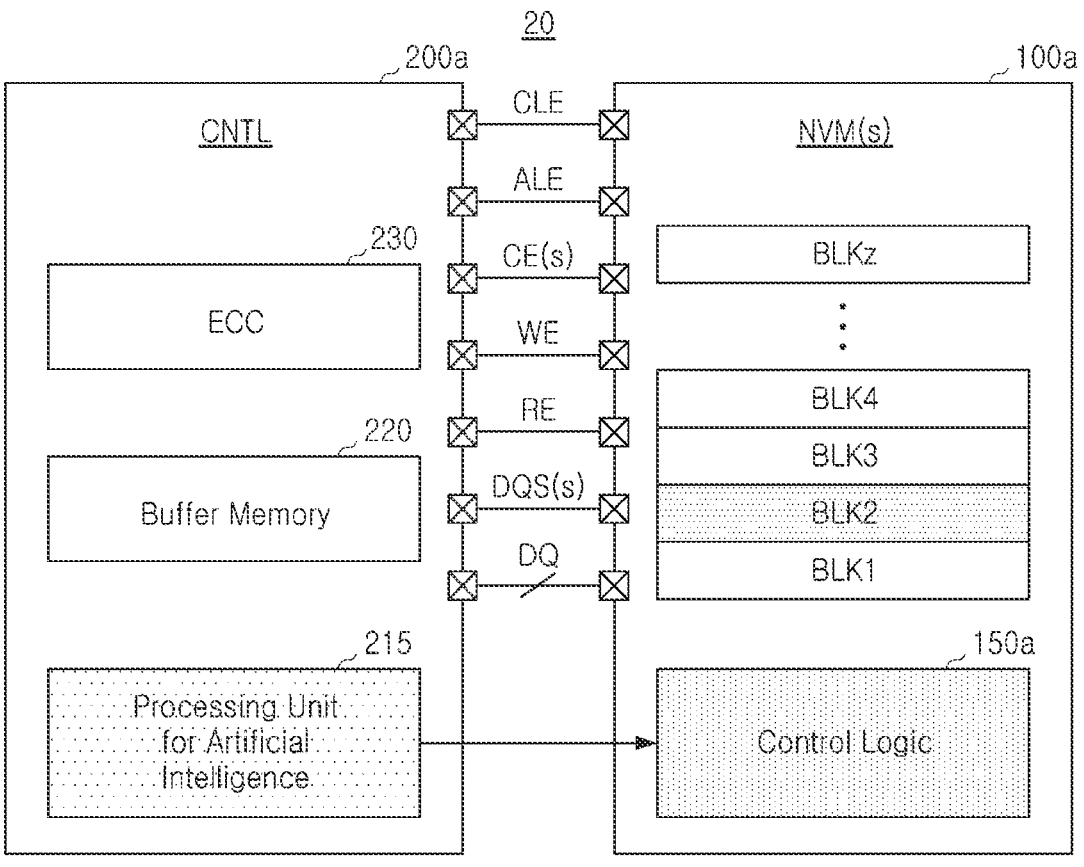
FIG. 19 is a diagram illustrating a storage device according to another example embodiment of the present disclosure.

FIG. 19 is a diagram illustrating a storage device 20 according to another example embodiment. Referring to FIG. 19, the storage device 20 may include a nonvolatile memory device 100a and a controller 200a.

The controller 200a may include an artificial intelligence processor 215 for generating parameters for performing a CDR operation as compared to the example illustrated in FIG. 1. The artificial intelligence processor 215 may be implemented to perform the CDR operations described in FIGS. 1 to 18.

The artificial intelligence processor 215 may determine whether to operate the CDR through a machine learning method. The machine learning method may operate based on at least one of various machine learning algorithms such as neural network, support vector machine (SVM), linear regression, decision tree, generalized linear models (GLM), random forest, gradient boosting machine (GBM), deep learning, clustering, anomaly detection, dimension reduction, or the like. The machine learning method may receive at least one parameter and may predict an error tendency for a corresponding memory block based on a previously trained training model using the received parameter. In an example embodiment, the machine learning method may be performed by a hardware accelerator configured to perform learning. The machine learning method will be described in greater detail in U.S. Pat. No. 10,802,728, US 2020-0151539, US 2021-050067, and US 2021-0109669, which are incorporated herein by reference.

Accordingly, the control logic 150a of the nonvolatile memory device 100 may perform an optimal read operation under the control of the above artificial intelligence processor 215.

The nonvolatile memory device in an example embodiment may be implemented in a chip to chip (C2C) structure.

Figure 20:
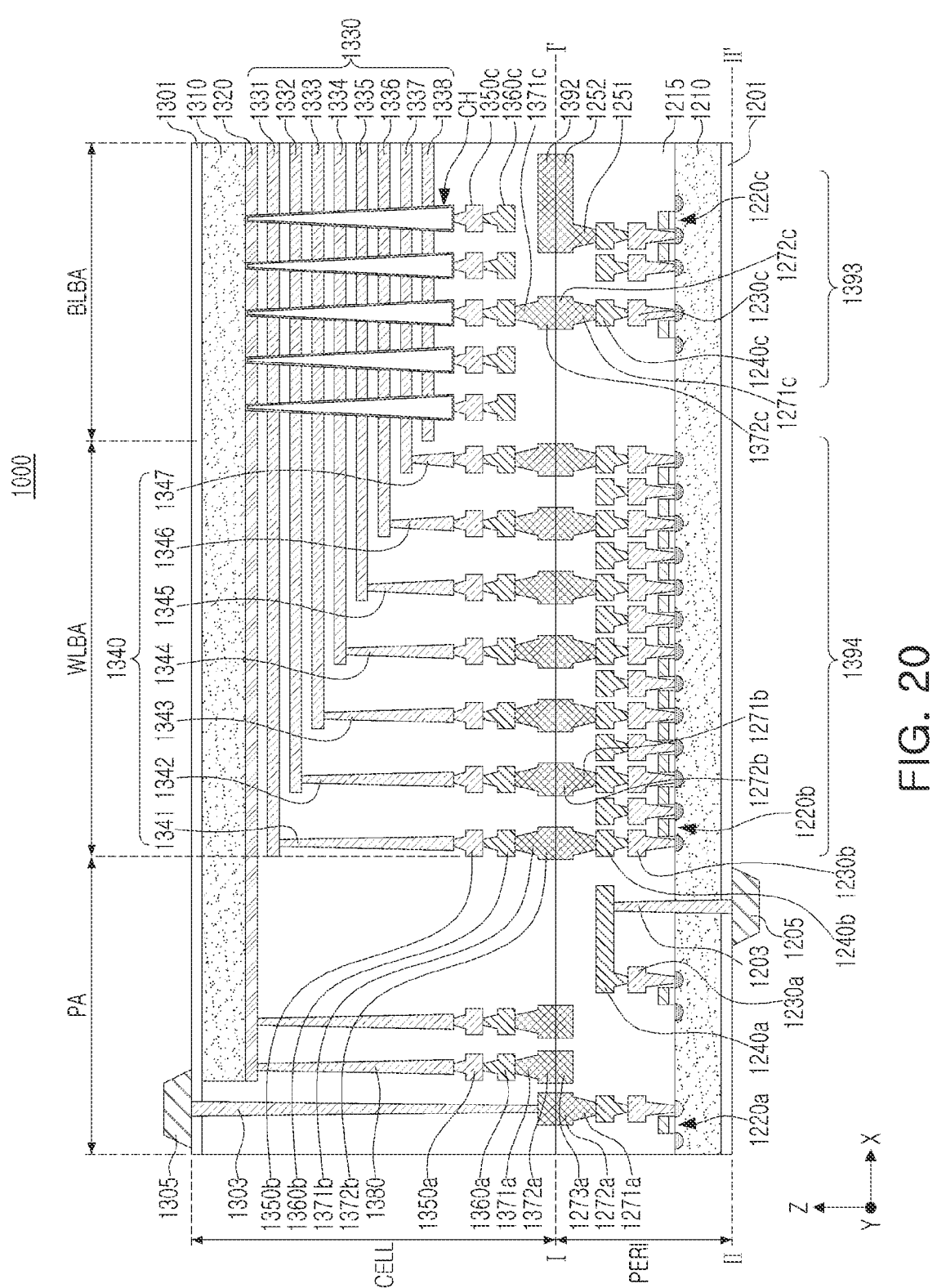
FIG. 20 is a diagram illustrating a nonvolatile memory device implemented in a C2C structure according to another example embodiment of the present disclosure.

FIG. 20 is a diagram illustrating a nonvolatile memory device 1000 implemented in a C2C structure according to another example embodiment. The C2C structure may refer to manufacturing an upper chip including a cell area (CELL) on a first wafer, manufacturing a lower chip including a peripheral circuit area (PERI) on a second wafer different from the first wafer, and connecting the upper chip to the lower chip by a bonding method. For example, the bonding method may be of electrically connecting the bonding metal formed in the uppermost metal layer of the upper chip to the bonding metal formed in the uppermost metal layer of the lower chip. In an example embodiment, when the bonding metal is formed of copper (Cu), the bonding method may be a Cu-to-Cu bonding method. In another example embodiment, the bonding metal may be formed of aluminum (Al) or tungsten (W).

Each of the peripheral circuit area PERI and the cell area CELL of the nonvolatile memory device 1000 may include an external pad bonding area PA, a wordline bonding area WLBA, and a bitline bonding area BLBA.

The peripheral circuit area PERI may include a first substrate 1210, an interlayer insulating layer 1215, a plurality of circuit devices 1220a, 1220b, and 1220c formed on the first substrate 1210, first metal layers 1230a, 1230b, and 1230c connected to the plurality of circuit devices 1220a, 1220b, and 1220c, respectively, and second metal layers 1240a, 1240b, and 1240c formed on the first metal layers 1230a, 1230b, and 1230c. In an example embodiment, the first metal layers 1230a, 1230b, and 1230c may be formed of tungsten having a relatively high resistivity. In an example embodiment, the second metal layers 1240a, 1240b, and 1240c may be formed of copper having relatively low resistivity.

In FIG. 20, the first metal layers 1230a, 1230b, 1230c and the second metal layers 1240a, 1240b, and 1240c are illustrated, but an example embodiment thereof is not limited thereto. At least one metal layer may be further formed on the second metal layers 1240a, 1240b, and 1240c. At least a portion of the one or more metal layers formed on the second metal layers 1240a, 1240b, and 1240c may be formed of aluminum having resistivity different from that of copper forming the second metal layers 1240a, 1240b, and 1240c.

In an example embodiment, the interlayer insulating layer 1215 may be disposed on the first substrate 1210 to cover the plurality of circuit devices 1220a, 1220b, and 1220c, the first metal layers 1230a, 1230b, and 1230c, and the second metal layers 1240a, 1240b, and 1240c. In an example embodiment, the interlayer insulating layer 1215 may include an insulating material such as silicon oxide or silicon nitride.

Lower bonding metals 1271b and 1272b may be formed on the second metal layer 1240b of the wordline bonding area WLBA. In the wordline bonding area WLBA, the lower bonding metals 1271b and 1272b of the peripheral circuit area PERI may be electrically connected to the upper bonding metals 1371b and 1372b of the cell area CELL by a bonding method. In an example embodiment, the lower bonding metals 1271b and 1272b and the upper bonding metals 1371b and 1372b may be formed of aluminum, copper, tungsten, or the like. Also, the upper bonding metals 1371b and 1372b of the cell area CELL may be referred to as first metal pads and the lower bonding metals 1271b and 1272b may be referred to as second metal pads.

The cell area CELL may include at least one memory block. In an example embodiment, the cell area CELL may include a second substrate 1310 and a common source line 1320. A plurality of wordlines 1331-1338 (1330) may be stacked on the second substrate 1310 in a direction (Z axis direction) perpendicular to the upper surface of the second substrate 1310. In an example embodiment, string selection lines and ground selection lines may be disposed on the upper and lower portions of the wordlines 1330, respectively. In an example embodiment, a plurality of wordlines 1330 may be disposed between the string selection lines and the ground selection line.

In the bitline bonding area BLBA, the channel structure CH may extend in a direction (Z axis direction) perpendicular to the upper surface of the second substrate 1310 and may penetrate the wordlines 1330, the string selection lines, and the ground selection line. The channel structure CH may include a data storage layer, a channel layer, and a filling insulating layer, and the channel layer may be electrically connected to the first metal layer 1350c and the second metal layer 1360c. For example, the first metal layer 1350c may be a bitline contact and the second metal layer 1360c may be a bitline. In an example embodiment, the bitline 1360c may extend in a first direction (Y axis direction) parallel to the upper surface of the second substrate 1310.

As illustrated in FIG. 20, an area in which the channel structure CH and the bitline 1360c are disposed may be defined as the bitline bonding area BLBA. In an example embodiment, the bitline 1360c may be electrically connected to the circuit devices 1220c providing the page buffer 1393 in the peripheral circuit area PERI in the bitline bonding area BLBA. For example, the bitline 1360c may be connected to the upper bonding metals 1371c and 1372c in the peripheral circuit area PERI. The upper bonding metals 1371c and 1372c may be connected to the lower bonding metals 1271c and 1272c connected to the circuit devices 1220c of the page buffer 1393. In the wordline bonding area WLBA, the wordlines 1330 may extend in a second direction (X axis direction) perpendicular to the first direction and parallel to the upper surface of the second substrate 1310. In an example embodiment, the wordline bonding area WLBA may be connected to the plurality of cell contact plugs 1341-1347 (1340). For example, the wordlines 1330 and the cell contact plugs 1340 may be connected to each other through pads provided by at least a portion of the wordlines 1330 extending by different lengths in the second direction. In an example embodiment, the first metal layer 1350b and the second metal layer 1360b may be connected in order to the upper portion of the cell contact plugs 1340 connected to the wordlines 1330. In an example embodiment, the cell contact plugs 1340 may be connected to the peripheral circuit area PERI through the upper bonding metals 1371b and 1372b of the cell area CELL and the lower bonding metals 1271b and 1272b of the peripheral circuit area PERI in the wordline bonding area WLBA.

In an example embodiment, the cell contact plugs 1340 may be electrically connected to the circuit devices 1220b providing the row decoder 1394 in the peripheral circuit area PERI. In an example embodiment, the operating voltages of the circuit devices 1220b providing the row decoder 1394 may be different from the operating voltages of the circuit devices 1220c providing the page buffer 1393. For example, the operating voltages of the circuit devices 1220c providing the page buffer 1393 may be greater than the operating voltages of the circuit devices 1220b providing the row decoder 1394.

A common source line contact plug 1380 may be disposed in the external pad bonding area PA. In an example embodiment, the common source line contact plug 1380 may be formed of a metal, a metal compound, or a conductive material such as polysilicon. The common source line contact plug 1380 may be electrically connected to the common source line 1320. The first metal layer 1350*a* and the second metal layer 1360*a* may be stacked in order on the common source line contact plug 1380. For example, an area in which the common source line contact plug 1380, the first metal layer 1350*a*, and the second metal layer 1360*a* are disposed may be defined as the external pad bonding area PA. The second metal layer 1360*a* may be electrically connected to the upper metal via 1371*a*. The upper metal via 1371*a* may be electrically connected to the upper metal pattern 1372*a*.

Input/output pads 1205 and 1305 may be disposed in the external pad bonding area PA. Referring to FIG. 18, a lower insulating layer 1201 covering a lower surface of the first substrate 1210 may be formed below the first substrate 1210. Also, a first input/output pad 1205 may be formed on the lower insulating layer 1201. In an example embodiment, the first input/output pad 1205 may be connected to at least one of the plurality of circuit devices 1220*a*, 1220*b*, and 1220*c* disposed in the peripheral circuit area PERI through the first input/output contact plug 1203. In an example embodiment, the first input/output pad 1205 may be separated from the first substrate 1210 by the lower insulating layer 1201. Also, a side insulating layer may be disposed between the first input/output contact plug 1203 and the first substrate 1210 and may electrically separate the first input/output contact plug 1203 from the first substrate 1210.

Referring back to FIG. 20, an upper insulating layer 1301 covering an upper surface of the second substrate 1310 may be formed on the second substrate 1310. Also, a second input/output pad 1305 may be disposed on the upper insulating layer 1301. In an example embodiment, the second input/output pad 1305 may be connected to at least one of the plurality of circuit devices 1220*a*, 1220*b*, and 1220*c* disposed in the peripheral circuit area PERI through the second input/output contact plug 1303, the lower metal pattern 1272*a*, and the lower metal via 1271*a*.

In an example embodiment, the second substrate 1310 and the common source line 1320 may not be disposed in a region in which the second input/output contact plug 1303 is disposed. Also, the second input/output pad 1305 may not overlap the wordlines 1330 in the third direction (Z axis direction). Referring to FIG. 20, the second input/output contact plug 1303 may be separated from the second substrate 1310 in a direction parallel to the upper surface of the second substrate 1310. Also, the second input/output contact plug 1303 may penetrate the interlayer insulating layer 1301 of the cell area CELL and may be connected to the second input/output pad 1305. In an example embodiment, the second input/output pad 1305 may be electrically connected to the circuit device 1220*a*.

In an example embodiment, the first input/output pad 1205 and the second input/output pad 1305 may be selectively formed. For example, the nonvolatile memory device 1000 may include only the first input/output pad 1205 disposed on the first substrate 1201 or only the second input/output pad 1305 disposed on the second substrate 1301. In another example embodiment, the nonvolatile memory device 1000 may include both the first input/output pad 1205 and the second input/output pad 1305.

The metal pattern of the uppermost metal layer in each of the external pad bonding area PA and the bitline bonding area BLBA included in each of the cell area CELL and the peripheral circuit area PERI may be present as a dummy pattern or the uppermost metal layer may be empty.

In the nonvolatile memory device 1000 in an example embodiment, in the external pad bonding area PA, the lower metal pattern 1273*a* having the same shape as that of the upper metal pattern 1372*a* of the cell area CELL may be formed on an uppermost metal layer of the peripheral circuit area PERI to correspond to the upper metal pattern 1372*a* formed on the uppermost metal layer of the cell area CELL. The lower metal pattern 1273*a* formed on the uppermost metal layer of the peripheral circuit area PERI may not be connected to a separate contact in the peripheral circuit area PERI. Similarly, an upper metal pattern having the same shape as that of the lower metal pattern of the peripheral circuit area PERI may also be formed on the upper metal layer of the cell area CELL to correspond to the lower metal pattern formed on an uppermost metal layer of the peripheral circuit area PERI in the external pad bonding area PA.

The nonvolatile memory device in an example embodiment may, for reducing an error bit during a read operation, apply an optimal read level to program states using information on a factor causing charge loss so as to not degrade the read performance of the NAND memory and to not deteriorate the guaranteed retention time. In the VNAND structure, a factor causing charge loss may be divided into charge loss due to hole lateral migration in the adjacent Ls area (a region between cells) and vertical charge loss of electrons. Since the hole lateral charge loss is proportional to the number of holes implanted into the Ls area, the on-cell information of the ERS cell may be used and as the electron vertical charge loss is proportional to the number of electrons in the highest state, the off-cell information of the highest state may be used.

The method of operating a nonvolatile memory device in an example embodiment may perform cell count by sensing the highest state and the erase state in the NAND memory of the 4 bit, 5 bit, 6 bit or more, and read level control may be performed based on the above information.

In an example embodiment, the operation method may, monitoring a key factor causing charge loss, perform an off-cell count operation of the erase state and an on-cell count operation of the highest state to reduce the read error and the counter source. In an example embodiment, the read level corrected during the data read may be different from the read level for cell count. In an example embodiment, a read level offset of subsequent 2nd read, 3rd read, . . . Nth read may be corrected based on the 1st read cell count. In an example embodiment, a read level off may be applicable with reference to a cell count criterion differentiated according to WL, block, plane, die stack, and chip. In an example embodiment, the cell count for the highest state and the erase state may be applicable in a differentiated manner according to WL, block, plane, die stack, and chip.

When a read command is transmitted from the controller of the storage device in an example embodiment to the NAND, various ranges of information about the cell count and read level offset information corresponding thereto may be transmitted to the lookup table. Also, NAND may perform cell count by sensing the highest state and the ERS state and may select an appropriate read level among a plurality of read levels during sensing to determine page data and may perform a read operation.

According to the aforementioned example embodiments, a nonvolatile memory device, a controller for controlling the same, a storage device having the same, and a method of operating the same may, by compensating a read level using cell count information of a highest program state and an erase state, improve reliability of data.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the example embodiments have been illustrated and described above, it will be apparent to those skilled in the art that modifications and variations could be made without departing from the scope of the present disclosure as defined by the appended claims.

What is claimed is:

1. A nonvolatile memory device comprising:
a plurality of memory blocks including at least two strings between each of bitlines and a common source line, wherein each of the at least two strings includes at least one string select transistor connected between one of the bitlines and the common source line in series, a plurality of memory cells, and at least one ground transistor, wherein the at least one string select transistor has a gate connected to a string selection line, wherein each of the plurality of memory cells receives a wordline voltage from a corresponding wordline, and wherein the at least one ground transistor has a gate connected to a ground selection line; and
a control logic configured to receive a specific command and an address and to perform a cell count-based dynamic read (CDR) operation on the plurality of memory cells connected to one of wordlines of a selected block among the plurality of memory blocks in response to the address, wherein the CDR operation is configured to provide a first cell count value for a highest state among a plurality of states and a second cell count value for an erase state among the plurality of states, wherein the control logic includes:
a cell count comparator circuit configured to compare the first cell count value with at least one reference value according to the CDR operation and to compare the second cell count value with the at least one reference value; and
a read level selector configured to select a read level according to a result of a comparison of the cell count comparator circuit.

2. The nonvolatile memory device of claim 1, wherein:
the first cell count value includes an off-cell count value, and
the second cell count value includes an on-cell count value.

3. The nonvolatile memory device of claim 1, wherein the nonvolatile memory device is configured to receive a parameter having the at least one reference value and a read level offset lookup table along with the specific command.

4. The nonvolatile memory device of claim 1, wherein the control logic is configured to use the selected read level for a read operation of a page selected by the address and other pages of a same wordline.

5. The nonvolatile memory device of claim 1, wherein the control logic is configured to correct an additional read level, selected according to the first cell count value for the highest state in a read operation of a first plane, for reading pages connected to a corresponding wordline in a read operation of a second plane.

6. The nonvolatile memory device of claim 1, wherein the control logic is configured to obtain the first cell count value for the highest state in a normal read operation of one of pages corresponding to the address or to obtain the second cell count value for the erase state in a normal read operation of another page corresponding to the address.

7. The nonvolatile memory device of claim 1, wherein each of the plurality of memory cells includes one of a triple level cell (TLC), a quadruple level cell (QLC), a penta-level cell (PLC), and a hexa-level cell (HLC).

8. The nonvolatile memory device of claim 1, wherein:
the at least one reference value includes first to fifth reference values, and
a selected read level offset is determined depending on a range determined according to the first to fifth reference values.

9. The nonvolatile memory device of claim 1, wherein:
each of the plurality of memory cells includes a quadruple level cell (QLC), and
at least one read level of eighth to fifteenth states among the plurality of states is compensated according to the first cell count value.

10. The nonvolatile memory device of claim 1, wherein:
each of the plurality of memory cells includes a quadruple level cell (QLC), and
at least one read level of first to seventh states among the plurality of states is compensated according to the second cell count value.

11. A method of operating a nonvolatile memory device, the method comprising:
receiving a specific command;
performing a cell count operation to provide a first cell count value for a highest state among a plurality of states and a second cell count value for an erase state among the plurality of states in response to the specific command; and
changing a read level according to the cell count operation,
wherein the performing the cell count operation includes:
performing an off-cell count operation corresponding to the highest state; and
performing an on-cell count operation corresponding to the erase state.

12. The method of claim 11, further comprising receiving a parameter having reference values related to the cell count operation and a read level offset lookup table corresponding to the read level along with the specific command.

13. The method of claim 11, further comprising:
determining a range corresponding to the first cell count value of the off-cell count operation for the highest state; and
performing a read operation according to the read level corresponding to the determined range.

14. The method of claim 11, further comprising:

determining a range corresponding to the second cell count value of the on-cell count operation for the erase state; and performing a read operation according to the read level corresponding to the determined range.

15. The method of claim 11, comprising:

comparing the first cell count value with at least one reference value according to the cell count operation;

comparing the second cell count value with the at least one reference value.

16. The method of claim 15, comprising selecting a read level according to a result of the comparison of the first cell count value with at least one reference value and a result of the comparison of the second cell count value with the at least one reference value.

17. The method of claim 16, comprising using the selected read level for a read operation of a page selected by an address associated with the specific command and for other pages connected to a same wordline as the selected page.

18. The method of claim 16, wherein:

the at least one reference value includes first to fifth reference values, and a selected read level offset is determined depending on a range determined according to the first to fifth reference values.

19. The method of claim 11, comprising correcting an additional read level, selected according to the first cell count value for the highest state in a read operation of a first plane, for reading pages connected to a corresponding wordline in a read operation of a second plane.

20. The method of claim 11, comprising obtaining the first cell count value for the highest state in a normal read operation of one of pages corresponding to an address associated with the specific command or obtaining the second cell count value for the erase state in a normal read operation of another page corresponding to the address.

* * * * *